(12) United States Patent
Isoue et al.

(10) Patent No.: US 11,504,951 B2
(45) Date of Patent: *Nov. 22, 2022

(54) POLYVINYL ACETAL RESIN FILM FOR LAMINATED GLASS

(71) Applicant: KURARAY EUROPE GMBH, Hattersheim (DE)

(72) Inventors: Koichiro Isoue, Kurashiki (JP); Hirotaka Yasuda, Kurashiki (JP); Jun Koishikawa, Chiyoda-ku (JP); Uwe Keller, Troisdorf (DE)

(73) Assignee: KURARAY EUROPE GMBH, Hattersheim (DE)

(*) Notice: Subject to any disclaimer, the term of this patent is extended or adjusted under 35 U.S.C. 154(b) by 0 days.

This patent is subject to a terminal disclaimer.

(21) Appl. No.: 16/497,531

(22) PCT Filed: Mar. 27, 2018

(86) PCT No.: PCT/JP2018/012553
§ 371 (c)(1),
(2) Date: Sep. 25, 2019

(87) PCT Pub. No.: WO2018/181386
PCT Pub. Date: Oct. 4, 2018

(65) Prior Publication Data
US 2020/0023620 A1   Jan. 23, 2020

(30) Foreign Application Priority Data

Mar. 27, 2017 (JP) .............................. JP2017-061690
Mar. 27, 2017 (JP) .............................. JP2017-061694
May 8, 2017 (JP) .............................. JP2017-092575

(51) Int. Cl.
*B32B 17/10* (2006.01)
*B32B 3/14* (2006.01)
(Continued)

(52) U.S. Cl.
CPC .......... *B32B 17/10761* (2013.01); *B32B 3/14* (2013.01); *B32B 3/266* (2013.01);
(Continued)

(58) Field of Classification Search
CPC ... B32B 17/00–17/1099; B32B 27/306; B32B 15/00–15/20; C08L 29/14; H05B 3/84–3/86
See application file for complete search history.

(56) References Cited

U.S. PATENT DOCUMENTS 3,998,792 A * 12/1976 Hermann .......... B32B 17/10761
528/246
5,340,654 A   8/1994 Ueda
(Continued)

FOREIGN PATENT DOCUMENTS

CN   101506693   8/2009
CN   106163804   11/2016
(Continued)

OTHER PUBLICATIONS

Machine translation of EP2325002. Retrieved Dec. 4, 2020.*
(Continued)

*Primary Examiner* — Prashant J Khatri
(74) *Attorney, Agent, or Firm* — BakerHostetler

(57) ABSTRACT

A polyvinyl acetal resin film for laminated glass,
a viscosity of toluene/ethanol=1/1 (by mass ratio) solution of a polyvinyl acetal resin in a resin composition constituting the polyvinyl acetal resin film with a concentration of 10% by mass, measured at 30 rpm and 20° C. by using a Brookfield-type (B-type) viscometer, being more than 200 mPa·s,
the polyvinyl acetal resin film comprising a plasticizer in an amount of 0 to 20% by mass based on a total mass of the resin composition constituting the polyvinyl acetal resin film, and
(Continued)

the polyvinyl acetal resin film having a thickness of 10 to 350 μm.

20 Claims, 2 Drawing Sheets

(51) Int. Cl.
*B32B 15/02* (2006.01)
*B32B 15/082* (2006.01)
*B32B 15/20* (2006.01)
*B32B 27/30* (2006.01)
*B32B 3/26* (2006.01)
*B60J 1/00* (2006.01)
*C08J 5/18* (2006.01)

(52) U.S. Cl.
CPC ............ *B32B 15/02* (2013.01); *B32B 15/082* (2013.01); *B32B 15/20* (2013.01); *B32B 17/10036* (2013.01); *B32B 27/30* (2013.01); *B60J 1/002* (2013.01); *C08J 5/18* (2013.01); B32B 2307/102 (2013.01); B32B 2307/202 (2013.01); B32B 2307/306 (2013.01); B32B 2307/42 (2013.01); B32B 2307/422 (2013.01); B32B 2311/12 (2013.01); B32B 2315/08 (2013.01); B32B 2329/06 (2013.01); B32B 2605/006 (2013.01); B32B 2605/08 (2013.01); C08J 2329/14 (2013.01); C08J 2429/14 (2013.01)

(56) References Cited

U.S. PATENT DOCUMENTS

| | | | |
|---|---|---|---|
| 2009/0283304 A1* | 11/2009 | Winoto | B82Y 10/00 174/257 |
| 2010/0028642 A1* | 2/2010 | Steuer | B32B 17/10761 428/220 |
| 2010/0165460 A1 | 7/2010 | Furui et al. | |
| 2010/0020040 A1 | 8/2010 | Garbar et al. | |
| 2010/0200407 A1 | 8/2010 | Garbar et al. | |
| 2010/0206374 A1* | 8/2010 | Karpinski | C08K 5/0016 136/256 |
| 2010/0307585 A1 | 12/2010 | Keller et al. | |
| 2011/0049434 A1* | 3/2011 | Ootsuki | C08L 29/14 252/500 |
| 2012/0225287 A1 | 9/2012 | Keller et al. | |
| 2012/0244329 A1 | 9/2012 | Iwamoto et al. | |
| 2012/0261404 A1 | 10/2012 | Choi et al. | |
| 2013/0006339 A1 | 3/2013 | Kurishima et al. | |
| 2013/0063393 A1 | 3/2013 | Kurishima et al. | |
| 2013/0228365 A1* | 9/2013 | Uprety | B32B 3/16 174/257 |
| 2015/0217547 A1 | 8/2015 | Greb et al. | |
| 2016/0160034 A1* | 6/2016 | Lu | B32B 17/10761 524/503 |
| 2016/0278166 A1 | 9/2016 | Seong et al. | |
| 2016/0288459 A1 | 10/2016 | Keller et al. | |
| 2017/0022343 A1 | 1/2017 | Sakakibara et al. | |
| 2017/0136743 A1 | 5/2017 | Yoshida et al. | |
| 2017/0361575 A1 | 12/2017 | Zeng et al. | |
| 2017/0362575 A1 | 12/2017 | Zeng et al. | |
| 2018/0141315 A1* | 5/2018 | Kawada | B32B 27/30 |

FOREIGN PATENT DOCUMENTS

| | | | |
|---|---|---|---|
| DE | 690332 | 4/1940 | |
| EP | 2325002 A1 * | 5/2011 | ............ B32B 17/10 |
| EP | 3076751 A1 | 10/2016 | |
| EP | 3219686 A1 | 9/2017 | |
| JP | 5-1108 A | 1/1993 | |
| JP | 2000-203901 A | 7/2000 | |
| JP | 2003-503236 A | 1/2003 | |
| JP | 5060496 B2 * | 10/2012 | ............... C08F 8/28 |
| JP | 2013-56811 A | 3/2013 | |
| JP | 2013-516043 A | 5/2013 | |
| JP | 2014-136796 A | 7/2014 | |
| JP | 2015-151026 A | 8/2015 | |
| WO | WO 01/00404 A1 | 1/2001 | |
| WO | 2011-102197 A1 | 8/2011 | |
| WO | WO 2015/019438 A1 | 2/2015 | |
| WO | WO 2015/059828 A1 | 4/2015 | |
| WO | WO 2015/125689 A1 | 8/2015 | |
| WO | 2015-019445 A1 | 12/2015 | |
| WO | WO 2016/052603 A1 | 4/2016 | |
| WO | WO-2016087967 A1 * | 6/2016 | ........... H05K 1/0274 |
| WO | WO 2016/186029 A1 | 11/2016 | |
| WO | WO-2016186029 A1 * | 11/2016 | .............. C09J 11/06 |

OTHER PUBLICATIONS

Misra et al. "The relation between the molecular weight and intrinsic viscosity of polyvinyl alcohol", Colloid & Polymer Science, 258, (1980); pp. 152-155.*
Machine translation of JP5060496. Retrieved May 18, 2021.*
International Search Report dated Jun. 26, 2018 in PCT/JP2018/012553, 2 pages.
International Preliminary Report on Patentability and Written Opinion dated Oct. 10, 2019 in PCT/JP2018/012553 (submitting English translation only), 7 pages.
International Preliminary Report on Patentability and Written Opinion dated Oct. 10, 2019 in PCT/JP2018/012560 (submitting English translation only), 6 pages.
Extended European Search Report dated Nov. 25, 2020 in Application No. 18778264.4.
Office Action dated Jun. 2, 2021 in the corresponding Chinese patent application No. 201880021579.6.
Machine translation of the Office Action dated Jun. 2, 2021 in the corresponding Chinese patent application No. 201880021579.6.
Extended European Search Report dated Mar. 24, 2021 in Application No. 18774730.8.
Herrmann—DE 690,332 C—MT-glass w-interlayer—Bibliographic Data—May 28, 1940 (Year: 1940).
JP 2008-546165 A—transparent conductive coating—Bibliographic Data—2008 (Year: 2008).
Whisnant—LibreTexts—Enginnering—Polymer Chem.—MW averages—Jul. 5, 2021 (Year: 2021).

* cited by examiner

POLYVINYL ACETAL RESIN FILM FOR LAMINATED GLASS

TECHNICAL FIELD

The present invention relates to a polyvinyl acetal resin film for laminated glass. Moreover, the present invention relates to a laminated glass which has the polyvinyl acetal resin film between a plurality of transparent substrates.

BACKGROUND ART

As a method of removing icing and cloudiness of a glass in a building or a vehicle, a method of applying hot air to the glass is known. However, this method has a problem that it takes time to obtain sufficient forward visibility. In addition, in order to prevent malfunction of a camera or a sensor attached to a glass such as a windshield, it is necessary to heat around the camera or the sensor to remove icing and cloudiness. However, in an electric vehicle in which combustion heat of fuel cannot be used for this removal, there is a problem that the method of heating air by electricity and applying hot air to a glass is inefficient, which directly leads to a decrease in cruising distance.

Thus, a method of removing icing and cloudiness by installing a heating wire on a glass to be distributed with power is proposed.

For example, Patent Document 1 describes a laminated glass containing electric wires. The laminated glass is formed by covering upper and lower sides of a functional layer with an upper adhesive layer and a lower adhesive layer, and covering upper and lower sides of the upper and lower adhesive layers with an upper glass plate and a lower glass plate, with an electric wire interposed between the lower adhesive layer and the lower glass plate. Patent Document 1 specifically describes an example using a tungsten wire as the electric wire.

Further, for example, Patent Document 2 describes a heating element. The heating element comprises a transparent substrate, an adhesive layer provided on at least one side of the transparent substrate, a conductive heat emitting line provided on the adhesive layer, a coating film capsulating the conductive heat emitting line and an upper side of the adhesive layer not covered by the heat emitting line, a bus bar electrically connected to the conductive heat emitting line, and a power part connected to the bus bar. Patent Document 2 specifically describes an example using a PET (polyethylene terephthalate) film as the transparent substrate.

Furthermore, for example, Patent Document 3 describes a method of producing a laminated glass composite with an electrically conductive structure, comprising bonding two transparent plates with at least one sheet A and at least one sheet B, in which the sheet A contains a polyvinylacetal PA and a plasticizer WA, and the sheet B contains a polyvinylacetal PB and a plasticizer WB. As a method of forming the electrically conductive structure on the sheet, Patent Document 3 exemplifies general methods, such as printing method (screen printing, flexographic printing, gravure printing), vapor deposition, sputtering and electric deposition. Patent Document 3 provides no specific example.

Patent Document 4 proposes a method of printing a conductive ink on a transparent substrate such as PET, and describes that after a printing process, a post-processing step of blackening a printed wiring pattern may be performed.

PRIOR ART DOCUMENTS

Patent Documents

Patent Document 1: JP 2013-056811 A
Patent Document 2: JP 2013-516043 A
Patent Document 3: US 2016/288459 A1
Patent Document 4: JP 2015-151026 A

SUMMARY OF THE INVENTION

Problems to be Solved by the Invention

However, the process of arranging a large number of tungsten wires between the glass plates and integrating the tungsten wires with the functional layer as described in Patent Document 1 is complicated and inferior in productivity. In addition, since a thick tungsten wire is used, a problem with forward visibility occurs.

In a laminated glass using a PET film as described in Patent Document 2, there are problems that two interlayer films are required and thus a heating element is located near the center of the laminated glass, which lowers glass heating efficiency, that the PET film is inferior in curved surface followability and thus cannot be applied to a windshield having high curvature, that the PET film is inferior in stretchability and thus a head impact index at the time of collision increases, and that high haze derived from an adhesive for bonding a copper foil to the PET film arises.

In a polyvinyl acetal sheet as described in Patent Document 3, since a polyvinyl acetal sheet containing no or a small amount of plasticizer is inferior in film forming properties, only the sheet using polyvinyl acetal resin of low polymerization degree is used. When such a sheet and an interlayer film containing a plasticizer are laminated to produce a laminated glass, the plasticizer in the interlayer film is transferred to the polyvinyl acetal sheet, whereby there is a risk that heat resistance may be lowered and two glasses of a laminated glass may be misaligned when exposed to high temperature. In addition, there is a risk that a functional layer or an electrically conductive structure provided when the laminated glass is produced may be deformed or destroyed by melting of the polyvinyl acetal sheet. In the method of forming an electrically conductive structure on a polyvinyl acetal sheet by a printing method as described in Patent Document 3, it is difficult to form a thin uniform metal wire excellent in forward visibility. Also, in the method of forming an electrically conductive structure on a polyvinyl acetal sheet by vapor deposition or sputtering, since energy and time are required to form a thick metal layer for obtaining a necessary calorific value, production efficiency is lowered, and if a metal line width in the metal layer is increased in order to secure the necessary calorific value with a thin metal layer, there is a problem that the forward visibility decreases.

In the method of forming an electrically conductive structure on a PET substrate by a printing method described in Patent Document 4, there are problems that it is difficult to form a thin uniform metal wire excellent in forward visibility, and that even when surface blackening treatment is performed, the surface bonded to the substrate maintains metallic luster, and thus light reflection interferes with forward recognition.

A problem to be solved by the present invention is to provide a polyvinyl acetal resin film capable of suppressing deformation and destruction of a functional layer or a structure (an electrically conductive structure) when a laminated glass is produced and capable of suppressing misalignment of a glass of the obtained laminated glass under high temperature conditions, and a laminate (a laminated glass) using the polyvinyl acetal resin film.

In a more limited aspect, a problem to be solved by the present invention is to provide a polyvinyl acetal resin film having a conductive layer, in which production efficiency is high when a conductive layer (an electrically conductive structure) as a functional layer is provided and a haze derived from an adhesive for bonding the conductive layer does not occur (that is, the polyvinyl acetal resin film is optically excellent), and furthermore, a polyvinyl acetal resin film (heat generation film for window glass) which is excellent in curved surface followability and in which light reflection contributing to a decrease in forward visibility is reduced, and a laminate using the film.

Solutions to the Problems

The present inventors intensively studied in detail about a polyvinyl acetal resin film for laminated glass in order to solve the above problem, thereby completing the present invention.

That is, the present invention includes the following preferred embodiments.

[1] A polyvinyl acetal resin film for laminated glass, a viscosity of toluene/ethanol=1/1 (by mass ratio) solution of a polyvinyl acetal resin in a resin composition constituting the polyvinyl acetal resin film with a concentration of 10% by mass, measured at 30 rpm and 20° C. by using a Brookfield-type (B-type) viscometer, being more than 200 mPa·s, the polyvinyl acetal resin film comprising a plasticizer in an amount of 0 to 20% by mass based on a total mass of the resin composition constituting the polyvinyl acetal resin film, and the polyvinyl acetal resin film having a thickness of 10 to 350 μm.

[2] The polyvinyl acetal resin film according to the above [1], wherein a value indicating heat creep resistance measured with the polyvinyl acetal resin film bonded to a 0.76 mm thick plasticized polyvinyl butyral resin layer which contains 72% by mass of polyvinyl butyral resin having an acetalization degree of 69 to 71 mol % and containing a vinyl acetate unit as an acetyl group in an amount of 1 mol % or less and 28% by mass of triethylene glycol-bis-(2-ethylhexanoate) is 10 mm or less, the value indicating heat creep resistance being measured by a method of bonding the polyvinyl acetal resin film and the plasticized polyvinyl butyral resin layer, cutting the bonded polyvinyl acetal resin film and plasticized polyvinyl butyral resin layer into a sample having dimensions of 100 mm wide and 270 mm long, arranging and bonding the sample so as to be fit between glass A and glass B that have a width of 100 mm, a length of 300 mm and a thickness of 3 mm and are shifted by 30 mm in a length direction such that the glass A, the polyvinyl acetal resin film, the plasticized polyvinyl butyral resin layer, and the glass B are arranged in this order, bonding an iron plate of 1 kg with an adhesive to a surface of the glass B, which is opposite to a surface bonded to the plasticized polyvinyl butyral resin layer, to obtain a sample with the iron plate, and, after the sample with the iron plate is left in a thermostat at 100° C. for 1 week in a state in which a portion protruding 30 mm in the length direction faces upward and the glass A is fixed such that an angle of the sample with the iron plate is 80 to 90° with respect to a horizontal plane and a portion of the glass B to which the iron plate is bonded serves as an upper portion or an upper surface of the sample, measuring a distance (mm) by which the glass B has deviated.

[3] The polyvinyl acetal resin film according to the above [1] or [2], wherein a value indicating heat creep resistance measured with the polyvinyl acetal resin film arranged and bonded between two sheets of 0.38 mm thick plasticized polyvinyl butyral resin layers which contain 72% by mass of polyvinyl butyral resin having an acetalization degree of 69 to 71 mol % and containing a vinyl acetate unit as an acetyl group in an amount of 1 mol % or less and 28% by mass of triethylene glycol-bis-(2-ethylhexanoate) is 10 mm or less, the value indicating heat creep resistance being measured by the same method as in measurement of the value indicating heat creep resistance according to the above [2].

[4] The polyvinyl acetal resin film according to any one of the above [1] to [3], wherein molecular weight distribution of the polyvinyl acetal resin in the resin composition constituting the polyvinyl acetal resin film is 2.7 or more.

[5] The polyvinyl acetal resin film according to any one of the above [1] to [4], wherein the polyvinyl acetal resin in the resin composition constituting the polyvinyl acetal resin film is a mixture of at least two polyvinyl acetal resins having different viscosity average polymerization degrees, or an acetalized product of a mixture of at least two polyvinyl alcohol-based resins having different viscosity average polymerization degrees.

[6] The polyvinyl acetal resin film according to any one of the above [1] to [5], wherein the resin composition constituting the polyvinyl acetal resin film contains an alkali metal salt and/or an alkaline earth metal salt.

[7] The polyvinyl acetal resin film according to any one of the above [1] to [6], wherein a hydroxyl group amount of the polyvinyl acetal resin in the resin composition constituting the polyvinyl acetal resin film is 26 to 34 mol %.

[8] The polyvinyl acetal resin film according to any one of the above [1] to [6], wherein a hydroxyl group amount of the polyvinyl acetal resin in the resin composition constituting the polyvinyl acetal resin film is 12 to 26 mol %.

[9] The polyvinyl acetal resin film according to any one of the above [1] to [8], wherein the polyvinyl acetal resin film comprises a functional layer on at least one side of the polyvinyl acetal resin film.

[10] A method of producing the polyvinyl acetal resin film according to the above [9], comprising applying a material constituting the functional layer by coating, printing or lamination on at least one side of the polyvinyl acetal resin film.

[11] The polyvinyl acetal resin film according to the above [9], wherein the functional layer is a conductive layer.

[12] The polyvinyl acetal resin film according to the above [11], comprising another polyvinyl acetal resin film on a surface having the conductive layer of the polyvinyl acetal resin film.

[13] The polyvinyl acetal resin film according to the above [11] or [12], wherein the conductive layer is based on metal foil.

[14] The polyvinyl acetal resin film according to the above [9], comprising no adhesive layer, whose refractive index difference with respect to the polyvinyl acetal resin film is 0.01 or more, between the polyvinyl acetal resin film and the functional layer.

[15] The polyvinyl acetal resin film according to the above [9], comprising no adhesive layer between the polyvinyl acetal resin film and the functional layer.

[16] The polyvinyl acetal resin film according to any one of the above [11] to [13], wherein the conductive layer has a linear, grid-like or net-like shape.

[17] The polyvinyl acetal resin film according to any one of the above [11] to [13] and [16], wherein the conductive layer comprises a plurality of linear conductive materials having a line width of 0.01 to 5 mm.

[18] The polyvinyl acetal resin film according to any one of the above [11] to [13] and [16], wherein the conductive layer comprises a plurality of linear conductive materials having a line width of 1 to 30 µm.

[19] The polyvinyl acetal resin film according to any one of the above [11] to [13] and [16] to [18], wherein a conductive material forming the conductive layer comprises silver or copper.

[20] The polyvinyl acetal resin film according to any one of the above [11] to [13] and [16] to [19], wherein one or both sides of the conductive layer are subjected to a low-reflectance treatment.

[21] The polyvinyl acetal resin film according to any one of the above [11] to [13] and [16] to [19], wherein all surfaces of the conductive layer are subjected to a low-reflectance treatment.

[22] The polyvinyl acetal resin film according to the above [20] or [21], wherein the low-reflectance treatment is a blackening treatment.

[23] The polyvinyl acetal resin film according to any one of the above [11] to [13] and [16] to [22], comprising a bus bar connected to the conductive layer.

[24] The polyvinyl acetal resin film according to the above [23], wherein the bus bar is integrally formed with the conductive layer.

[25] A method of producing the polyvinyl acetal resin film according to any one of the above [13] and [16] to [24], comprising the steps of:
bonding metal foil and the polyvinyl acetal resin film; and
forming a conductive layer from the polyvinyl acetal resin film with the metal foil obtained in the bonding step.

[26] A laminate comprising the polyvinyl acetal resin film according to any one of the above [9] and [11] to [24], between a plurality of transparent substrates.

[27] A laminate comprising the polyvinyl acetal resin film according to the above [23] or [24] between a plurality of transparent substrates, the laminate further comprising an electrode connected to the bus bar.

[28] The laminate according to the above [26] or [27], wherein the polyvinyl acetal resin film is in direct contact with the transparent substrate.

[29] The laminate according to any one of the above [26] to [28], further comprising a plasticized polyvinyl acetal resin layer between a plurality of transparent substrates.

[30] The laminate according to the above [29], wherein a difference between a hydroxyl group amount of the polyvinyl acetal resin in the resin composition constituting the polyvinyl acetal resin film and a hydroxyl group amount of the polyvinyl acetal resin in the resin composition constituting the plasticized polyvinyl acetal resin layer is 4% by mass or less as a difference in percentage by mass of vinyl alcohol units.

[31] The laminate according to the above [29] or [30], wherein the functional layer or the conductive layer is in direct contact with the plasticized polyvinyl acetal resin layer.

[32] The laminate according to any one of the above [29] to [31], wherein the plasticized polyvinyl acetal resin layer has at least one function selected from the group consisting of a specific wavelength light shielding function, a heat shielding function, a sound insulating function, a light emitting function, a display function and a double image prevention function.

Effects of the Invention

By using the polyvinyl acetal resin film of the present invention, deformation and destruction of the functional layer or the conductive layer can be suppressed when a laminated glass is produced, and misalignment of a glass of the obtained laminated glass under high temperature conditions can be suppressed.

It is possible to obtain a polyvinyl acetal resin film having a conductive layer, in which production efficiency is high when the conductive layer is provided and a haze derived from the adhesive for bonding the conductive layer does not occur (that is, the polyvinyl acetal resin film is optically excellent) and a polyvinyl acetal resin film which is excellent in curved surface followability and in which light reflection contributing to a decrease in forward visibility is reduced.

EMBODIMENTS OF THE INVENTION

Figure 1:
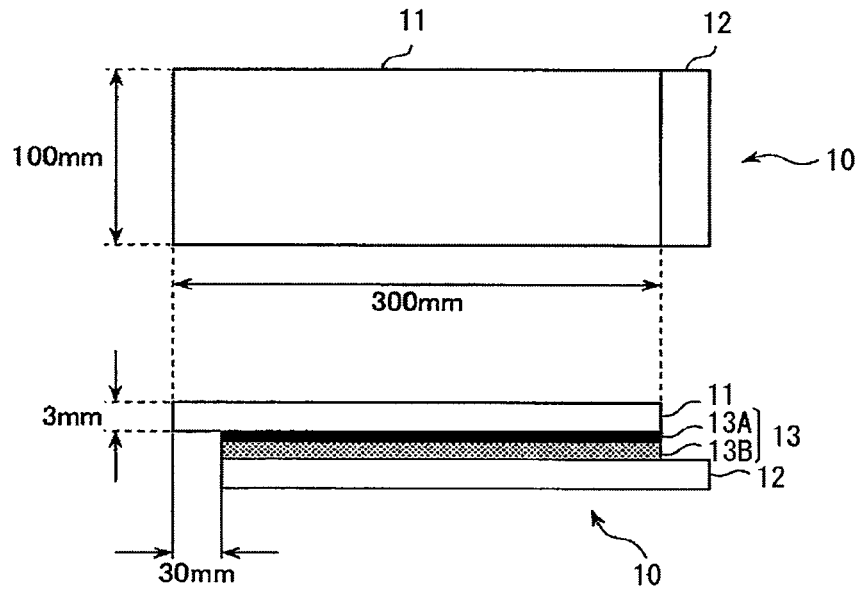
FIG. 1 illustrates a schematic view of a laminated glass used for measurement of a heat creep resistance value (1).

The polyvinyl acetal resin film of the present invention is a polyvinyl acetal resin film for laminated glass. A viscosity of toluene/ethanol=1/1 (by mass ratio) solution of a polyvinyl acetal resin in a resin composition constituting the polyvinyl acetal resin film with a concentration of 10% by mass, measured at 30 rpm and 20° C. by using a Brookfield-type (B-type) viscometer, is more than 200 mPa·s, the polyvinyl acetal resin film comprises a plasticizer in an amount of 0 to 20% by mass based on a total mass of the resin composition constituting the polyvinyl acetal resin film, and the polyvinyl acetal resin film has a thickness of 10 to 350 µm.

The thickness of the polyvinyl acetal resin film of the present invention is 10 to 350 µm. When the thickness of the polyvinyl acetal resin film is less than 10 µm, there arises a problem that distortion or the like occurs in a functional layer due to shrinkage or deformation of the polyvinyl acetal resin film. On the other hand, when the thickness of the polyvinyl acetal resin film is more than 350 µm, there arises a problem that due to the fact that an amount of the plasticizer to be transferred from a plasticized polyvinyl acetal resin layer optionally laminated on the polyvinyl acetal resin film increases and the amount of the plasticizer in the plasticized polyvinyl acetal resin layer decreases, head impact increases when a vehicle mounted with a vehicle glass using the polyvinyl acetal resin film has collided. The thickness of the polyvinyl acetal resin film is preferably 20 µm or more and more preferably 30 µm or more. The thickness of the polyvinyl acetal resin film is preferably 330 μm or less, more preferably 295 μm or less, more preferably 270 μm or less, more preferably 250 μm or less, more preferably 150 μm or less, more preferably 120 μm or less, and most preferably less than 100 μm. In one aspect, the thickness of the polyvinyl acetal resin film is 10 μm or more and 250 μm or less. When the thickness of the polyvinyl acetal resin film is in the range from the above lower limit value to the above upper limit value, the above problem is hard to occur, and good film forming properties are more easily obtained. The thickness of the polyvinyl acetal resin film can be measured using a thickness gauge, a laser microscope, or the like.

<Resin Used to Constitute Polyvinyl Acetal Resin Film>

The polyvinyl acetal resin film of the present invention contains a polyvinyl acetal resin produced by acetalization of a polyvinyl alcohol-based resin, such as polyvinyl alcohol or ethylene vinyl alcohol copolymer.

The polyvinyl acetal resin film may contain one polyvinyl acetal resin or two or more polyvinyl acetal resins which differ from each other in any one or more of a viscosity average polymerization degree, an acetalization degree, an acetyl group amount, a hydroxyl group amount, an ethylene content, a molecular weight of aldehyde used for acetalization, and a chain length. When the polyvinyl acetal resin film contains two or more different polyvinyl acetal resins, from the viewpoint of ease of melt molding and from the viewpoint of preventing deformation of the functional layer at the time of producing a laminated glass and misalignment of a glass at the time of using the laminated glass, the polyvinyl acetal resin is preferably a mixture of at least two polyvinyl acetal resins having different viscosity average polymerization degrees, or an acetalized product of a mixture of at least two polyvinyl alcohol-based resins having different viscosity average polymerization degrees.

The polyvinyl acetal resin used in the present invention can be produced, for example, by the following method, but is not limited thereto. First, an aqueous solution of polyvinyl alcohol or ethylene vinyl alcohol copolymer having a concentration of 3 to 30% by mass is maintained in a temperature range of 80 to 100° C., and then gradually cooled over 10 to 60 minutes. When the temperature drops to −10 to 30° C., an aldehyde and an acid catalyst are added, and the acetalization reaction is carried out for 30 to 300 minutes while keeping the temperature constant. Next, the temperature of the reaction solution is raised to a temperature of 20 to 80° C. over 30 to 200 minutes, and held for 30 to 300 minutes. Thereafter, the reaction solution is filtered if necessary, and then neutralized by adding a neutralizing agent such as alkali, and the resin is filtered, washed with water and dried to produce a polyvinyl acetal resin.

The acid catalyst used for the acetalization reaction is not particularly limited. Both organic and inorganic acids can be used. Examples of such acid catalysts include acetic acid, p-toluenesulfonic acid, nitric acid, sulfuric acid, and hydrochloric acid. Among these acid catalysts, hydrochloric acid, sulfuric acid and nitric acid are preferably used from the viewpoint of acid strength and ease of removal by washing.

From the viewpoint of more easily obtaining a polyvinyl acetal resin having a suitable breaking energy, an aldehyde or a keto compound used for producing the polyvinyl acetal resin is preferably a linear, branched or cyclic compound having 2 to 10 carbon atoms and more preferably a linear or branched compound. This gives a proper linear or branched acetal group. The polyvinyl acetal resin used in the present invention may be an acetalized product obtained by acetalizing polyvinyl alcohol or ethylene vinyl alcohol copolymer with a mixture of a plurality of aldehydes or keto compounds.

The polyvinyl acetal resin used in the present invention is preferably a polyvinyl acetal resin produced by the reaction of at least one polyvinyl alcohol and one or more aliphatic unbranched aldehydes having 2 to 10 carbon atoms. As such an aldehyde, n-butyraldehyde is preferable from the viewpoint of more easily obtaining a polyvinyl acetal resin having a suitable breaking energy. The content of n-butyraldehyde in aldehyde used for acetalization is preferably 50% by mass or more, more preferably 80% by mass or more, still more preferably 95% by mass or more, and particularly preferably 99% by mass or more and may be 100% by mass.

The polyvinyl alcohol-based resin used to produce the polyvinyl acetal resin may be a single substance or a mixture of polyvinyl alcohol-based resins having different viscosity average polymerization degrees, degrees of hydrolysis, or the like.

The viscosity average polymerization degree of the polyvinyl alcohol-based resin which is a raw material of the polyvinyl acetal resin is preferably 100 or more, more preferably 300 or more, more preferably 400 or more, still more preferably 600 or more, particularly preferably 700 or more, and most preferably 750 or more. When the viscosity average polymerization degree of the polyvinyl alcohol-based resin is equal to or more than the above lower limit value, deformation and disconnection of a conductive layer are more easily suppressed when a laminated glass is produced, and in the obtained laminated glass, a phenomenon in which the glass is misaligned by heat is more easily prevented. The viscosity average polymerization degree of the polyvinyl alcohol-based resin is preferably 5000 or less, more preferably 3000 or less, still more preferably 2500 or less, particularly preferably 2300 or less, and most preferably 2000 or less. When the viscosity average polymerization degree of the polyvinyl alcohol-based resin is equal to or less than the above upper limit value, good film forming properties are more easily obtained. The viscosity average polymerization degree of the polyvinyl alcohol-based resin can be measured based on JIS K 6726 "Polyvinyl alcohol test method".

A preferable numerical value of the viscosity average polymerization degree of the polyvinyl acetal resin is the same as the numerical value of the viscosity average polymerization degree of the polyvinyl alcohol-based resin described above. When the polyvinyl acetal resin film contains two or more different polyvinyl acetal resins, it is preferable that the viscosity average polymerization degree of at least one polyvinyl acetal resin is in the range from the above lower limit value to the above upper limit value.

A preferable acetyl group amount in the polyvinyl acetal resin used to constitute the polyvinyl acetal resin film is as follows. That is, when a repeat unit is assumed to be a unit comprising two carbon atoms of the main chain in the polyvinyl alcohol resin which is a raw material for producing the polyvinyl acetal resin (for example, a vinyl alcohol unit, a vinyl acetate unit, and an ethylene unit), the vinyl acetate unit is in an amount of preferably 0.1 to 20 mol % and more preferably 0.5 to 3 mol % or 5 to 8 mol % based on the repeat units. The acetyl group amount (hereinafter means an amount of vinyl acetate units) can be adjusted within the above range by appropriately adjusting a saponification degree of the polyvinyl alcohol-based resin of the raw material. The acetyl group amount affects the polarity of the polyvinyl acetal resin, which may change the plasticizer compatibility and mechanical strength of the polyvinyl acetal resin film. When the polyvinyl acetal resin film contains the polyvinyl acetal resin in which the acetyl group amount is within the above range, good bonding with the optionally laminated plasticized polyvinyl acetal resin layer, reduction of optical distortion and the like are more easily achieved. When the polyvinyl acetal resin film contains two or more different polyvinyl acetal resins, the acetyl group amount of at least one polyvinyl acetal resin is preferably within the above range.

The acetalization degree of the polyvinyl acetal resin used in the present invention is not particularly limited. Assuming that a repeat unit is the unit comprising two carbon atoms of the main chain in the polyvinyl alcohol resin which is a raw material for producing the polyvinyl acetal resin (for example, a vinyl alcohol unit, a vinyl acetate unit, and an ethylene unit), the acetalization degree is the amount of the above repeat units forming acetal based on the repeat units. The acetalization degree is preferably 40 to 86 mol %, more preferably 45 to 84 mol %, more preferably 50 to 82 mol %, still more preferably 60 to 82 mol %, and particularly preferably 68 to 82 mol %. The acetalization degree of the polyvinyl acetal resin can be adjusted within the above range by appropriately adjusting the amount of aldehyde used in acetalizing the polyvinyl alcohol-based resin. When the acetalization degree is within the above range, the mechanical strength of the polyvinyl acetal resin film of the present invention tends to be sufficient, and the compatibility between the polyvinyl acetal resin and the plasticizer is unlikely to be reduced. When the polyvinyl acetal resin film contains two or more different polyvinyl acetal resins, the acetalization degree of at least one polyvinyl acetal resin is preferably within the above range.

The hydroxyl group amount of the polyvinyl acetal resin is preferably 6 to 26% by mass, more preferably 12 to 24% by mass, more preferably 15 to 22% by mass, and more preferably 18 to 21% by mass as the mass of the vinyl alcohol units of the polyvinyl acetal resin. When a repeat unit is assumed to be a unit comprising two carbon atoms of the main chain in the polyvinyl alcohol resin which is a raw material for producing the polyvinyl acetal resin (for example, a vinyl alcohol unit, a vinyl acetate unit, and an ethylene unit), the vinyl alcohol unit is preferably 9 to 36 mol %, more preferably 18 to 34 mol %, further preferably 22 to 34 mol %, yet further preferably 26 to 34 mol %, particularly preferably 26 to 31 mol %, and extremely preferably 26 to 30 mol % based on the repeat unit. When the hydroxyl group amount (hereinafter means an amount of vinyl alcohol units) is within the above range, a difference in refractive index with the optionally laminated plasticized polyvinyl acetal resin layer is more easily reduced, and a laminated glass with little optical unevenness is more easily obtained. On the other hand, in order to additionally impart sound insulation performance, the preferable range is 6 to 20% by mass, more preferably 8 to 18% by mass, still more preferably 10 to 15% by mass, and particularly preferably 11 to 13% by mass. Further, the preferable range is 9 to 29 mol %, more preferably 12 to 26 mol %, still more preferably 15 to 23 mol %, and particularly preferably 16 to 20 mol %. The hydroxyl group amount can be adjusted within the above range by adjusting the amount of aldehyde used in acetalizing the polyvinyl alcohol-based resin. When the polyvinyl acetal resin film contains two or more different polyvinyl acetal resins, the hydroxyl group amount of at least one polyvinyl acetal resin is preferably within the above range.

The polyvinyl acetal resin is generally constituted of an acetal group unit, a hydroxyl group unit, and an acetyl group unit, and these respective units can be measured by the "Testing Methods for Polyvinyl Butyral" of JIS K 6728 or a nuclear magnetic resonance method (NMR).

When the polyvinyl acetal resin contains a unit other than the acetal group unit, by measuring a unit quantity of a hydroxyl group and a unit quantity of an acetyl group and subtracting these both unit quantities from an acetal group unit quantity in the case of not containing a unit other than the acetal group unit, the remaining acetal group unit quantity can be calculated.

The viscosity of a 10% by mass solution of the polyvinyl acetal resin in the resin composition constituting the polyvinyl acetal resin film in toluene/ethanol=1/1 (by mass ratio) is more than 200 mPa·s as measured at 30 rpm and 20° C. by using a Brookfield-type (B-type) viscometer. When the viscosity is 200 mPa·s or less, deformation and destruction of the functional layer or the conductive layer cannot be sufficiently suppressed when a laminated glass is produced, and misalignment of a glass of the obtained laminated glass under high temperature conditions cannot be sufficiently suppressed. The viscosity is preferably 210 mPa·s or more, more preferably 220 mPa·s or more, more preferably 230 mPa·s or more, still more preferably 240 mPa·s or more, and particularly preferably 265 mPa·s or more. When the viscosity of the polyvinyl acetal resin is equal to or more than the above lower limit value, it is easy to suppress deformation and destruction of the functional layer or the conductive layer when the laminated glass is produced and to suppress misalignment of a glass of the obtained laminated glass under high temperature conditions. When the polyvinyl acetal resin produced using a polyvinyl alcohol-based resin having a high viscosity average polymerization degree as a raw material or a part of the raw material is used alone or in combination, the viscosity of the polyvinyl acetal resin can be adjusted to more than 200 mPa·s, and in a preferred embodiment, to equal to or more than the lower limit value. When the polyvinyl acetal resin used to constitute the polyvinyl acetal resin film consists of a mixture of resins, the viscosity is the viscosity of such a mixture.

The viscosity is usually 1000 mPa·s or less, preferably 800 mPa·s or less, more preferably 500 mPa·s or less, still more preferably 450 mPa·s or less, and particularly preferably 400 mPa·s from the viewpoint of more easily obtaining good film forming properties.

A peak top molecular weight of the polyvinyl acetal resin in the resin composition constituting the polyvinyl acetal resin film is preferably 115,000 to 200,000, more preferably 120,000 to 160,000, and particularly preferably 130,000 to 150,000. When the polyvinyl acetal resin produced using a polyvinyl alcohol-based resin having a high viscosity average polymerization degree as a raw material or a part of the raw material is used alone or in combination, the peak top molecular weight of the polyvinyl acetal resin can be adjusted to within the above range. When the peak top molecular weight of the polyvinyl acetal resin is within the above range, suitable film forming properties and suitable film physical properties (for example, laminate suitability, creep resistance and elongation at break) are more easily obtained.

Molecular weight distribution of the polyvinyl acetal resin in the resin composition constituting the polyvinyl acetal resin film, that is, a ratio (Mw/Mn) of weight average molecular weight (Mw) to number average molecular weight (Mn) is preferably 2.7 or more, more preferably 2.8 or more, and particularly preferably 2.9 or more. By acetalizing a mixture of polyvinyl alcohol-based resins having different viscosity average polymerization degrees or mixing acetalized products of the polyvinyl alcohol-based resins having different viscosity average polymerization degrees, the molecular weight distribution of the polyvinyl acetal resin can be adjusted to equal to or more than the lower limit value. When the molecular weight distribution of the polyvinyl acetal resin is equal to or more than the lower limit value, both film forming properties and suitable film physical properties (for example, laminate suitability, creep resistance and elongation at break) are more easily realized. The upper limit of the molecular weight distribution is not particularly limited. From the viewpoint of ease of film formation, the molecular weight distribution is usually 10 or less and preferably 5 or less.

When the polyvinyl acetal resin film contains two or more different polyvinyl acetal resins, the peak top molecular weight and the molecular weight distribution of at least one polyvinyl acetal resin are preferably within the above range.

The peak top molecular weight and molecular weight distribution can be determined by using gel permeation chromatography (GPC) with polystyrene of known molecular weight as a standard.

The polyvinyl acetal resin film preferably contains uncrosslinked polyvinyl acetal from the viewpoint of more easily obtaining good film forming properties. The polyvinyl acetal resin film may contain cross-linked polyvinyl acetal. Methods for cross-linking polyvinyl acetals are described, for example, in EP 1527107 B1 and WO 2004/063231 A1 (thermal self-cross-linking of polyvinyl acetals containing carboxyl groups), EP 1606325 A1 (polyvinyl acetals cross-linked with polyaldehydes) and WO 2003/020776 A1 (polyvinyl acetal cross-linked with glyoxylic acid). In addition, a method of appropriately adjusting acetalization reaction conditions to control an intermolecular acetal bonding amount to be generated or control a degree of blocking of a remaining hydroxyl group is also useful.

<Plasticizer>

In the present invention, the amount of the plasticizer in the polyvinyl acetal resin film is 0 to 20% by mass based on the total mass of the resin composition constituting the polyvinyl acetal resin film. When the amount of the plasticizer exceeds 20% by mass, deformation and/or disconnection of the functional layer or the conductive layer occur when a laminated glass is produced.

The amount of the plasticizer is preferably 0 to 19% by mass, more preferably 0 to 15% by mass, still more preferably 0 to 10% by mass, and particularly preferably 0 to 5% by mass. The amount of the plasticizer is preferably 20 parts by mass or less, more preferably 0 to 19 parts by mass, still more preferably 0 to 15 parts by mass, particularly preferably 0 to 10 parts by mass, and most preferably 0 to 5 parts by mass, with respect to 100 parts by mass of the polyvinyl acetal resin. When the amount of plasticizer in the polyvinyl acetal resin film is within the above range, a polyvinyl acetal resin film excellent in film forming properties and handleability is more easily produced, and the deformation and disconnection of the functional layer or the conductive layer are more easily suppressed when a laminated glass using the polyvinyl acetal resin film is produced.

When the polyvinyl acetal resin film contains the plasticizer, one or more compounds of the following group are preferably used as the plasticizer.

Esters of polyvalent aliphatic or aromatic acids. Examples thereof include dialkyl adipates (e.g. dihexyl adipate, di-2-ethylbutyl adipate, dioctyl adipate, di-2-ethyl hexyl adipate, hexyl cyclohexyl adipate, diheptyl adipate, dinonyl adipate, diisononyl adipate, and heptyl nonyl adipate); esters of adipic acid with alcohol or alcohol containing an ether compound [e.g. di(butoxyethyl)adipate, di(butoxyethoxyethyl)adipate]; dialkyl sebacates (e.g. dibutyl sebacate); esters of sebacic acid with alcohol containing an alicyclic or ether compound; esters of phthalic acid (e.g. butyl benzyl phthalate and bis-2-butoxyethyl phthalate); and esters of alicyclic polyhydric carboxylic acid with aliphatic alcohol (e.g. 1,2-cyclohexane dicarboxylic acid diisononyl esters).

Esters or ethers of polyvalent aliphatic or aromatic alcohols or oligoether glycols with one or more aliphatic or aromatic substituents. Examples thereof include esters of glycerin, diglycol, triglycol, tetraglycol and the like with a linear or branched, aliphatic or alicyclic carboxylic acid. Specific examples thereof include diethylene glycol-bis-(2-ethylhexanoate), triethylene glycol-bis-(2-ethylhexanoate) (hereinafter sometimes referred to as "3GO"), triethylene glycol-bis-(2-ethylbutanoate), tetraethylene glycol-bis-(2-ethylhexanoate), tetraethylene glycol-bis-n-heptanoate, triethylene glycol-bis-n-heptanoate, triethylene glycol-bis-n-hexanoate, tetraethylene glycol dimethyl ether, and dipropylene glycol dibenzoate.

Phosphate esters of aliphatic or aromatic alcohols. Examples thereof include tris(2-ethylhexyl)phosphate, triethylphosphate, diphenyl-2-ethylhexyl phosphate, and tricresyl phosphate.

Esters of citric acid, succinic acid, and/or fumaric acid.

A polyester or an oligoester composed of a polyhydric alcohol and a polyvalent carboxylic acid, a terminal esterified product or etherified product thereof, a polyester or an oligoester composed of lactone or hydroxycarboxylic acid, or a terminal esterified product or etherified product thereof may be used as a plasticizer.

When the polyvinyl acetal resin film contains a plasticizer, from the viewpoint of suppressing problems associated with transfer of the plasticizer between the polyvinyl acetal resin and, if laminated, the plasticized polyvinyl acetal resin layer (for example, problems such as a change in physical properties with time), it is preferable to use the same plasticizer as the plasticizer contained in the plasticized polyvinyl acetal resin layer to be laminated or a plasticizer which does not impair physical properties of the plasticized polyvinyl acetal resin layer (for example, heat resistance, light resistance, transparency, and plasticization effect). From such a viewpoint, as plasticizers, triethylene glycol-bis-(2-ethylhexanoate), triethylene glycol-bis(2-ethylbutanoate), tetraethylene glycol-bis-(2-ethylhexanoate), and tetraethylene glycol-bis-n-heptanoate are more preferred, and triethylene glycol-bis-(2-ethylhexanoate) is particularly preferred.

<Additive>

The polyvinyl acetal resin film may further contain another additive. Examples of such an additive include water, ultraviolet absorbers, antioxidants, adhesion regulators, brighteners or fluorescent brighteners, stabilizers, dyes, processing aids, impact modifiers, flowability improvers, crosslinking agents, pigments, light emitting materials, refractive index modifiers, heat shielding materials, organic or inorganic nanoparticles, calcined silicic acid, and surfactants.

In an embodiment in which the polyvinyl acetal resin film has a conductive layer as a functional layer, in order to suppress corrosion of the conductive layer, it is preferable that the polyvinyl acetal resin film contains a corrosion inhibitor. The amount of the corrosion inhibitor contained in the polyvinyl acetal resin film is preferably 0.005 to 5% by mass based on the mass of the resin composition constituting the polyvinyl acetal resin film. Examples of the corrosion inhibitor include substituted or unsubstituted benzotriazoles.

In one embodiment, the resin composition constituting the polyvinyl acetal resin film may contain an alkali metal salt and/or alkaline earth metal salt as an adhesion regulator. Specifically, the resin composition preferably contains a salt composed of one or more metals selected from sodium, potassium, magnesium and calcium, and at least one carboxylic acid having 2 to 12 carbon atoms. The total mass of alkali metal atoms and alkaline earth metal atoms contained in an adhesion regulator to be added is preferably 10 ppm or more, more preferably 30 ppm or more, still more preferably 50 ppm or more, and particularly preferably 70 ppm or more, and preferably 1500 ppm or less, more preferably 1000 ppm or less, still more preferably 500 ppm or less, and particularly preferably 300 ppm or less, based on the total mass of the resin composition. When the total mass of alkali metal atoms and alkaline earth metal atoms is equal to or more than the above lower limit value, it is easy to achieve not too strong adhesion to a glass and to obtain sufficient penetration resistance. When this total amount is equal to or less than the above upper limit value, the tendency of whitening due to water absorption or peeling from a glass tends to decrease. The amount of the alkali metal salt relative to the total mass of the alkali metal salt and alkaline earth metal salt to be added is preferably 70% by mass or less, more preferably 50% by mass or less, and still more preferably 30% by mass or less, and preferably 5% by mass or more, more preferably 10% by mass or more, and still more preferably 15% by mass or more. When the ratio of the alkali metal salt is equal to or less than the above upper limit value, it is easy to suppress the tendency of whitening due to water absorption or peeling from a glass. When the ratio of the alkali metal salt is equal to or more than the lower limit value, it is easy to suppress the tendency for impact resistance to decrease.

<Method of Producing Polyvinyl Acetal Resin Film>

The method of producing a polyvinyl acetal resin film is not particularly limited. It is possible to fabricate a polyvinyl acetal resin film by blending the resin, optionally a predetermined amount of a plasticizer, and other additives if necessary, uniformly kneading the mixture, and then forming the mixture into a sheet (film) by a publicly-known film forming method such as an extrusion method, a calender method, a pressing method, a casting method and an inflation method.

Among the publicly-known film forming methods, a method to produce a film using an extruder is especially suitably employed. The temperature of the resin being extruded is preferably 150 to 250° C. and more preferably 170 to 230° C. When the resin temperature is too high, a polyvinyl acetal resin will undergo decomposition, and the content of volatile substances increases. When the temperature is too low, the content of volatile substances increases as well. In order to efficiently remove the volatile substances, it is preferable to remove the volatile substances from a vent port of the extruder by reducing the pressure.

In the polyvinyl acetal resin film of the present invention, a value indicating heat creep resistance (hereinafter referred to as "heat creep resistance value (1)") measured by the following measurement method (1) is preferably 10 mm or less, more preferably 5 mm or less, still more preferably 4 mm or less, and particularly preferably 3 mm or less.

<Method (1) of Measuring Heat Creep Resistance Value (1)>

First, a polyvinyl acetal resin film, and one sheet of a 0.76 mm thick plasticized polyvinyl butyral resin layer which contains 72% by mass of polyvinyl butyral resin having an acetalization degree of 69 to 71 mol % and containing a vinyl acetate unit as an acetyl group in an amount of 1 mol % or less and 28% by mass of triethylene glycol-bis-(2-ethylhexanoate) are cut to dimensions of 100 mm wide and 270 mm long. As illustrated in FIG. 1, the cut polyvinyl acetal resin film and the cut plasticized polyvinyl butyral resin layer are layered so as to fit between glass A and glass B that have a width of 100 mm, a length of 300 mm and a thickness of 3 mm and are shifted by 30 mm in the length direction, and are arranged in the order of the following "Configuration 1". The layered materials are bonded at 140° C. using a vacuum laminator and then treated at 140° C. and 1.2 MPa for 30 minutes using an autoclave to produce a laminated glass.

[Configuration 1] Glass a (3 mm Thick)/Polyvinyl Acetal Resin Film/Plasticized Polyvinyl Butyral Resin Layer (0.76 mm Thick)/Glass B (3 mm Thick)

Figure 3:
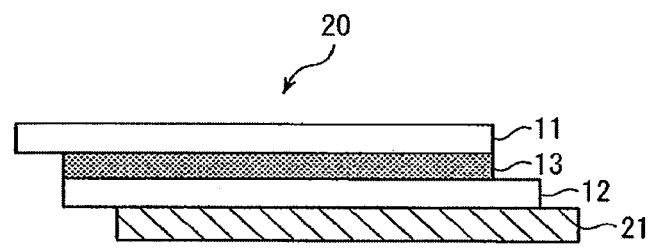
FIG. 3 illustrates a schematic view of the laminated glass used for measurement of the heat creep resistance value (1) or the heat creep resistance value (2) to which an iron plate is adhered.
Figure 4:
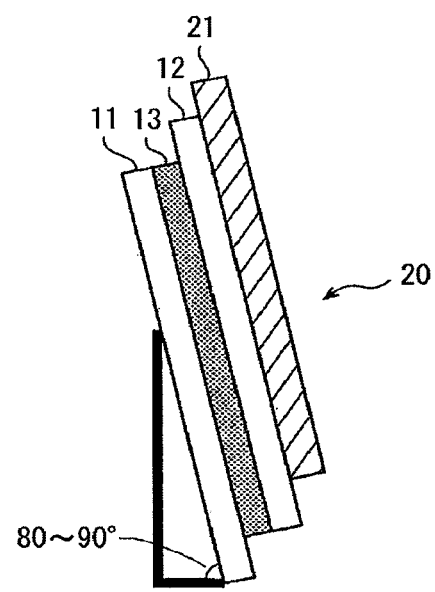
FIG. 4 illustrates a schematic view of a state in which the laminated glass to which the iron plate is bonded is fixed at a predetermined angle in order to measure the heat creep resistance value (1) or the heat creep resistance value (2).

Subsequently, as illustrated in FIG. 3, a surface of the glass B opposite to the surface bonded to the plasticized polyvinyl butyral resin layer is bonded with an iron plate of 1 kg with an adhesive. The laminated glass is left in a thermostat at 100° C. for 1 week, as illustrated in FIG. 4, in a state in which a portion protruding 30 mm in the length direction faces upward, and the glass A is fixed such that the angle of the sample with the iron plate is 80 to 90° with respect to a horizontal plane and a portion of the glass B to which the iron plate is bonded serves as an upper portion or an upper surface of the sample. Thereafter, a distance (mm) by which the glass B has deviated is measured, and this value is taken as the heat creep resistance value (1). The same heat creep resistance value (1) can be obtained even when the angle of the sample with the iron plate with respect to the horizontal plane is any angle from 80 to 90°. Usually, the heat creep resistance value (1) is measured at an angle of 85°.

When the heat creep resistance value (1) is equal to or less than the above value, it is easy to suppress deformation and destruction of the functional layer or the conductive layer when the laminated glass is produced and to suppress misalignment of a glass of the obtained laminated glass under high temperature conditions.

In the polyvinyl acetal resin film of the present invention, a value indicating heat creep resistance (hereinafter referred to as "heat creep resistance value (2)") measured by the following measurement method (2) is preferably 10 mm or less, more preferably 5 mm or less, still more preferably 4 mm or less, and particularly preferably 3 mm or less.

<Method (2) of Measuring Heat Creep Resistance Value (2)>

Figure 2:
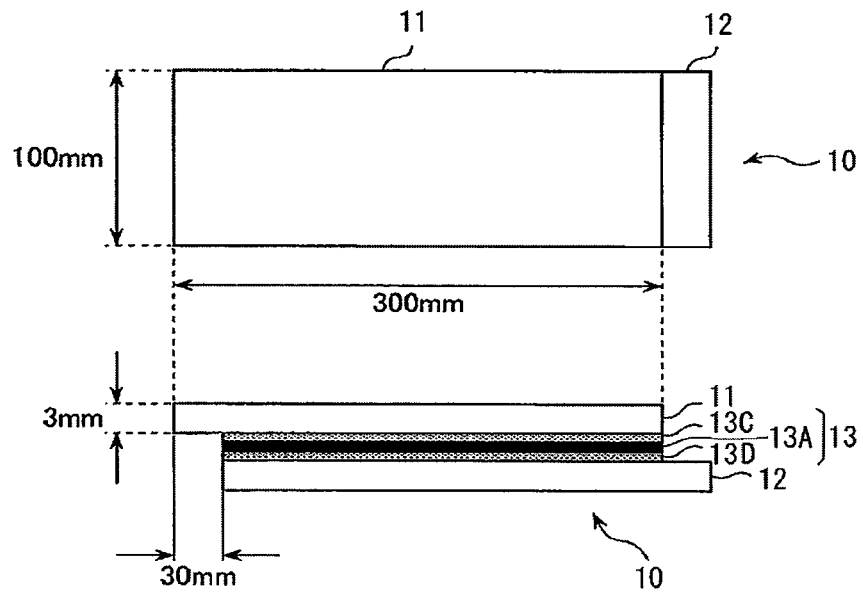
FIG. 2 illustrates a schematic view of a laminated glass used for measurement of a heat creep resistance value (2).

First, a polyvinyl acetal resin film, and two sheets of 0.38 mm thick plasticized polyvinyl butyral resin layers which contain 72% by mass of polyvinyl butyral resin having an acetalization degree of 69 to 71 mol % and containing a vinyl acetate unit as an acetyl group in an amount of 1 mol % or less and 28% by mass of triethylene glycol-bis-(2-ethylhexanoate) are cut to dimensions of 100 mm wide and 270 mm long. As illustrated in FIG. 2, the cut polyvinyl acetal resin film and the cut plasticized polyvinyl butyral resin layers are arranged in the order of the following "Configuration 2" in a state in which the polyvinyl acetal resin film is sandwiched between two sheets of the plasticized polyvinyl butyral resin layers such that the cut samples fit between glass A and glass B that have a width of 100 mm, a length of 300 mm and a thickness of 3 mm and are shifted by 30 mm in the length direction. The layered materials are bonded at 140° C. using a vacuum laminator and then treated at 140° C. and 1.2 MPa for 30 minutes using an autoclave to produce a laminated glass.

[Configuration 2] Glass a (3 mm Thick)/Plasticized Polyvinyl Butyral Resin Layer (0.38 mm Thick)/Polyvinyl Acetal Resin Film/Plasticized Polyvinyl Butyral Resin Layer (0.38 mm Thick)/Glass B (3 mm Thick)

Subsequently, as illustrated in FIG. 3, a surface of the glass B opposite to the surface bonded to the plasticized polyvinyl butyral resin layer is bonded with an iron plate of 1 kg with an adhesive. The laminated glass is left in a thermostat at 100° C. for 1 week, as illustrated in FIG. 4, in a state in which a portion protruding 30 mm in the length direction faces upward, and the glass A is fixed such that the angle of the sample with the iron plate is 80 to 90° with respect to a horizontal plane and a portion of the glass B to which the iron plate is bonded serves as an upper portion or an upper surface of the sample. Thereafter, a distance (mm) at which the glass B has deviated is measured, and this value is taken as the heat creep resistance value (2). The same heat creep resistance value (2) can be obtained even when the angle of the sample with the iron plate with respect to the horizontal plane is any angle from 80 to 90°. Usually, the heat creep resistance value (2) is measured at an angle of 85°.

When the heat creep resistance value (2) is equal to or less than the above value, it is easy to suppress deformation and destruction of the functional layer or the conductive layer when the laminated glass is produced and to suppress misalignment of a glass of the obtained laminated glass under high temperature conditions.

In the polyvinyl acetal resin film of the present invention, a value of ten-point average roughness Rz of at least one side is preferably 20 μm or less, more preferably 5 μm or less, and particularly preferably 3 μm or less, and a mean spacing Sm value of unevenness of at least one side is preferably 500 μm or more, more preferably 1000 μm or more, and particularly preferably 1300 μm or more. When the Rz value is equal to or less than the above value and the Sm value is equal to or more than the above value, uniform printing, coating or lamination becomes more easily possible, and unevenness in bonding between the polyvinyl acetal resin film and ink or metal foil is more easily suppressed. The Rz value and the Sm value can be measured according to JIS B0601-1994 using a surface roughness meter or a laser microscope.

As a method of adjusting the ten-point average roughness of the polyvinyl acetal resin film of the present invention to equal to or less than the above value and a method of adjusting the mean spacing of unevenness of the film to equal to or more than the above value, a melt extrusion method, a solvent cast method or the like can be adopted. In the melt extrusion method, a method using a T-die, a method of inflation molding, or the like can be used. A melt extruded from the T-die is preferably formed into a film by a smooth cooling roll. In order to form a smoother surface, it is preferable to use an elastic roll and a mirror surface metal roll in combination, and it is more preferable to use a metal elastic roll and the mirror surface metal roll in combination.

In one embodiment, the highest temperature among the melting point and glass transition temperature of the resin composition constituting the polyvinyl acetal resin film is preferably 30° C. or more and 180° C. or less. The highest temperature among the melting point and glass transition temperature of the resin composition is more preferably 150° C. or less, still more preferably 130° C. or less, particularly preferably 100° C. or less, and most preferably 90° C. or less, and more preferably 50° C. or more and particularly preferably 60° C. or more. When the highest temperature among the melting point and the glass transition temperature is in the range from the above lower limit value to the above upper limit value, the polyvinyl acetal resin film is more easily softened at a laminated glass production temperature and more easily well-follows a glass with high curvature and the like. In a case where the resin composition is amorphous and does not show a melting point, the highest glass transition temperature is within the above range. In a case where the resin composition does not have a glass transition temperature, the melting point is within the above range. The glass transition temperature and the melting point can be measured by a differential scanning calorimeter.

The amount of the polyvinyl acetal resin contained in the resin composition constituting the polyvinyl acetal resin film is preferably 50% by mass or more, more preferably 60% by mass or more, still more preferably 70% by mass or more, and particularly preferably 80% by mass or more based on the total mass of the resin composition. The upper limit of the content of the resin is not particularly limited, and is 100% by mass or less based on the total mass of the resin composition.

Although the polyvinyl acetal resin film may have a multi-component layer separation structure, in the layer separation structure, the average particle size of the island components is preferably less than 100 nm and more preferably less than 80 nm, and it is particularly preferable that no sea-island layer separation structure is shown. By not showing the sea-island layer separation structure or showing a sufficiently fine particle size, it is possible to ensure transparency which can be used for a car windshield and the like.

<Functional Layer>

In one embodiment, the polyvinyl acetal resin film of the present invention has a functional layer on at least one side. A functional layer is a layer which provides a specific function to a laminated glass.

One or more functional layers may be provided.

When the polyvinyl acetal resin film has a plurality of functional layers, the types of respective functional layers may be the same or different.

In a surface having the functional layer of the polyvinyl acetal resin film, the polyvinyl acetal resin film may have the functional layer on the entirety of the surface, or may have the functional layer on part of the surface. In an embodiment of laminating a plasticized polyvinyl acetal resin layer as described later to produce a laminated glass, it is preferable that the polyvinyl acetal resin film has the functional layer on part of the surface so that a plasticizer in the plasticized polyvinyl acetal resin layer can transfer to the polyvinyl acetal resin film. However, when the functional layer does not inhibit the transfer of the plasticizer from the plasticized polyvinyl acetal resin layer to the polyvinyl acetal resin film, the present invention is not limited thereto.

In the polyvinyl acetal resin film, from the viewpoint of more easily obtaining good bondability with the functional layer, the Rz value of the surface having the functional layer is preferably 20 μm or less, more preferably 5 μm or less, and still more preferably 3 μm or less, and the Sm value of the surface having the functional layer is preferably 500 μm or more, more preferably 1000 μm or more, and still more preferably 1300 μm or more.

The functional layer is preferably one or more selected from the group consisting of a conductive layer, a specific wavelength electromagnetic wave reflection layer such as an infrared reflection layer or an ultraviolet reflection layer, a color correction layer, an infrared absorption layer, an ultraviolet absorption layer, a fluorescent/light emitting layer, a sound insulation layer, an electrochromic layer, a photochromic layer, a thermochromic layer, a designability layer, and a high elastic modulus layer.

In an embodiment, the functional layer is preferably a conductive layer. In one embodiment, the conductive layer is based on metal foil.

A polyvinyl acetal resin film having a conductive layer on at least one side thereof may have another polyvinyl acetal resin film on the surface having the conductive layer. In this case, the conductive layer is protected by the other polyvinyl acetal resin film. As resins, plasticizers and additives used to constitute the other polyvinyl acetal resin film, the resins, plasticizers and additives described above in connection with the polyvinyl acetal resin film can be used. The resin composition constituting the above "another polyvinyl acetal resin film" and the resin composition constituting the above "polyvinyl acetal resin film having a conductive layer on at least one side thereof" may have the same composition or different compositions.

The thickness of the conductive layer is preferably 1 to 30 µm, more preferably 2 to 20 µm, more preferably 2 to 15 µm, more preferably 3 to 15 µm, still more preferably 3 to 12 µm, and particularly preferably 3 to 10 µm, from the viewpoint of electrical resistance, ease of production, and the like. The thickness of the conductive layer can be measured using a thickness gauge, a laser microscope, or the like.

The conductive layer preferably has a linear, grid-like or net-like shape from the viewpoint of electrical resistance, heat generation performance, electromagnetic wave absorbability, optical properties, forward visibility, and the like. Here, examples of the linear shape include straight, wavy and zigzag shapes. In one conductive layer, a single shape may exist, or a plurality of shapes may be mixed. In one embodiment, the linear shape is preferred from the viewpoint of more easily obtaining uniform and sufficient heat generation performance, and it is preferable that the shapes or intervals of adjacent linear conductive materials are nonuniform from the viewpoint of more easily preventing a moire phenomenon.

In an embodiment, for example, an embodiment in which a conductive layer is formed by a printing method, and a laminated glass in a region where ensuring of forward visibility is not important is partially heated or used as a sensor or an antenna, it is preferable that the conductive layer is formed of a plurality of linear conductive materials having a line width of 0.01 to 5 mm from the viewpoint of ensuring a sufficient calorific value and ease of production. That is, the line width of the linear conductive material (wiring) constituting the linear, grid-like or net-like shape described above is preferably 0.01 to 5 mm. The line width is more preferably 0.02 to 2 mm and particularly preferably 0.03 to 1 mm.

In another embodiment, for example, an embodiment in which laminated glass is entirely heated, the conductive layer is preferably formed of a plurality of linear conductive materials having a line width of 1 to 30 µm from the viewpoint of more easily ensuring both a sufficient calorific value and good forward visibility. That is, the line width of the linear conductive material constituting the linear, grid-like or net-like shape described above is preferably 1 to 30 µm. The line width is more preferably 2 to 15 µm and particularly preferably 3 to 12 µm. It is more preferable that a line width of a portion connected with a bus bar described later is thicker than line widths of other portions, from the viewpoint of capable of reducing the disconnection during production of a laminated glass.

Although a cross-sectional shape of the linear conductive material is not limited, it is preferable that the shape has at least one pair of parallel sides. From the viewpoint of making the linear conductive material thinnest and hard to see as viewed from the driver's sheet side, the side of a person on board or the observer side, that is, in a normal direction of a laminated glass while obtaining a necessary resistance value, the cross-sectional shape of the linear conductive material is preferably approximately square and more preferably square.

The conductive material forming the conductive layer preferably comprises silver or copper, and is more preferably made of silver or copper, from the viewpoint of ease of securing electrical resistance or a calorific value and ease of production. When the conductive layer is based on metal foil, the metal foil is preferably silver foil or copper foil, from the viewpoint of ease of etching and ease of acquisition of the metal foil.

One or both sides of the conductive layer are preferably treated to have low reflectance. In a more preferred embodiment, all surfaces of the conductive layer are treated to have low reflectance. When all the surfaces of the conductive layer are treated to have low reflectance, it is possible to suppress that due to light reflection due to metallic luster, light of headlights of oncoming car and following car is reflected by a windshield at night to decrease forward visibility. In the present invention, the expression "all surfaces are treated to have low reflectance" means that all of a surface of the linear conductive material bonded to the polyvinyl acetal resin film (bottom surface), a surface facing the bonding surface (front surface), and side surfaces thereof need to be treated to have low reflectance. In each surface, it is preferable that a treated portion has low reflectance of 50% or more, preferably 70% or more, more preferably 80% or more, and particularly preferably 90% or more. It is preferable that the linear conductive material of the present invention has a portion not treated to have low reflectance in its cross section, from the viewpoint of preventing embrittlement of the linear conductive material and preventing disconnection during lamination, and from the viewpoint that heat generation performance can be realized by a thinner linear conductive material while securing conductivity.

In the present invention, the expression "being treated to have low reflectance" means that treatment is performed such that a visible light reflectance measured according to JIS R 3106 is 30% or less. It is more preferable that the treatment is performed such that the visible light reflectance is 10% or less from the viewpoint of forward visibility. When the visible light reflectance is equal to or less than the above upper limit value, when producing a vehicle glass by laminating a polyvinyl acetal resin film having a conductive layer and a plasticized polyvinyl acetal resin layer as described later, a desired visible light reflectance is more easily obtained, and excellent forward visibility is more easily obtained.

Examples of the low reflectance treatment include blackening treatment (darkening treatment), browning treatment, and plating treatment. From the viewpoint of process passability, the low reflectance treatment is preferably blackening treatment. Thus, from the viewpoint of good forward visibility, it is particularly preferable that one or both sides of the conductive layer is blackened so that the visible light reflectance is 10% or less. Specifically, the blackening treatment can be performed using an alkaline blackening solution or the like.

There is no particular limitation on the method of low reflectance treatment for all the surfaces of the conductive layer. Examples of the method include a method where in a polyvinyl acetal resin film in which a surface of a linear conductive material, which is in contact with the polyvinyl acetal resin film, is treated to have low reflectance, a surface of the linear conductive material, which is not in contact with the polyvinyl acetal resin film, is further treated to have low reflectance, and a method of applying a linear conductive material treated to have low reflectance onto the polyvinyl acetal resin film. Among these methods, preferred is the method where in a polyvinyl acetal resin film in which a surface of a linear conductive material, which is in contact with the polyvinyl acetal resin film, is treated to have low reflectance, a surface of the linear conductive material, which is not in contact with the polyvinyl acetal resin film, is further treated to have low reflectance. More specifically, a method of bonding a surface treated to have low reflectance of metal foil having the surface treated to have low reflectance to a polyvinyl acetal resin film, etching the obtained bonded body to obtain a linear conductive material, and then further performing low reflectance treatment is particularly preferred because a high temperature calcining step is not required and a complicated step of bonding many linear conductive materials is not comprised.

The low reflectance treatment can be performed by roughening an object and/or coloring the object in black or the like. The low reflectance treatment is preferably performed by oxidation treatment, sulfurization treatment, nitridation treatment, chlorination treatment, blackened layer film formation, black plating, or the like, and particularly preferably performed by oxidation treatment or sulfurization treatment. In particular, the oxidation treatment is preferable because of being able to provide a more excellent antiglare effect and further in terms of simplicity of waste liquid disposal and environmental safety.

<Blackening by Oxidation>

The oxidation treatment is a method of forming an oxide film on a metal surface, and metallic luster can be thereby suppressed. The surface shape may be changed like a needle by the oxide film. When the oxidation treatment is carried out as the blackening treatment, as a blackening treatment solution, for example, a mixed aqueous solution of hypochlorite and sodium hydroxide, a mixed aqueous solution of chlorite and sodium hydroxide, a mixed aqueous solution of peroxodisulfuric acid and sodium hydroxide or the like is preferably used. Especially from the economic point of view, a mixed aqueous solution of hypochlorite and sodium hydroxide or a mixed aqueous solution of chlorite and sodium hydroxide is preferably used, and for example, it is more preferable that sodium chlorite sodium hydroxide=approximately 20:1 to 2:1 and a sodium hydroxide concentration is 4 to 20 g/L. When copper is treated with such an aqueous solution, $CuO$ and/or $Cu_2O$ can be formed, and a surface can be blackened. It is also preferable to use trisodium phosphate or the like in combination.

<Blackening by Sulfurization>

The sulfidation treatment is a method of forming a sulfidized film on a metal surface, and metallic luster is thereby suppressed. When the sulfidation treatment is carried out as the blackening treatment, as a blackening treatment solution, for example, an aqueous solution of sodium sulfide, potassium sulfide, barium sulfide, ammonium sulfide and the like is preferably used, and an aqueous solution of sodium sulfide, potassium sulfide and ammonium sulfide is more preferably used. Sulfidation can be carried out by vapor phase treatment with hydrogen sulfide.

<Blackening by Another Method>

Examples of another method of blackening treatment include a method where an aqueous solution of 0.25% by mass of tellurium dioxide (0.2% by mass as tellurium concentration), 0.45% by mass of hydrochloric acid, and 20% by mass of sulfuric acid is used as a blackening treatment solution, and the polyvinyl acetal resin film is immersed in the treatment solution at a treatment temperature of 25° C. for 30 seconds to form a coating of a blackened layer containing tellurium chloride ($TeCl_2$) on an exposed portion of copper. Examples thereof further include a method of forming a nitride film or a chlorination film on a surface of a conductive layer, and metallic luster can be suppressed by these methods.

In an embodiment in which the polyvinyl acetal resin film has a conductive layer based on metal foil, the thickness of the polyvinyl acetal resin film having the conductive layer is preferably 10 μm or more, more preferably 20 μm or more, and still more preferably 30 μm or more. When the thickness of the polyvinyl acetal resin film is equal to or more than the above value, there hardly arises a problem that distortion or the like occurs in the conductive layer due to shrinkage or deformation of the polyvinyl acetal resin film. The thickness of the polyvinyl acetal resin film having the conductive layer is preferably 350 μm or less, more preferably 330 μm or less, more preferably 270 μm or less, still more preferably 250 μm or less, particularly preferably 150 μm or less, and most preferably 100 μm or less. When the thickness of the polyvinyl acetal resin film is equal to or less than the above value, an amount of the plasticizer to be transferred from a plasticized polyvinyl acetal resin layer to the polyvinyl acetal resin film is reduced in a case where the plasticized polyvinyl acetal resin layer is laminated, and a reduction in the amount of the plasticizer in the plasticized polyvinyl acetal resin layer decreases. Therefore, there hardly arises a problem that head impact increases when a vehicle mounted with a vehicle glass using the polyvinyl acetal resin film has collided. The thickness of the polyvinyl acetal resin film can be measured using a thickness gauge, a laser microscope, or the like.

<Method of Applying Functional Layer to Polyvinyl Acetal Resin Film>

The method of applying a functional layer to a polyvinyl acetal resin film is not particularly limited. Examples thereof include a method of applying a material constituting the functional layer on at least one side of the polyvinyl acetal resin film by coating, printing or lamination.

The method of applying the material by coating, printing or lamination is not particularly limited.

Examples of the method of coating with the material include a method of coating the functional layer with a melt of a resin composition constituting the polyvinyl acetal resin film (for example, a method of melt-extruding the resin composition on the functional layer, or a method of coating the functional layer with the resin composition by knife coating or the like); a method of applying the functional layer to the polyvinyl acetal resin film by vapor deposition, sputtering or electric deposition; a method in which, in a case where the functional layer is composed of a resin composition, a resin composition constituting the polyvinyl acetal resin film and the resin composition constituting the functional layer are simultaneously extruded; and a method of dipping the polyvinyl acetal resin film in a solution of the resin composition constituting the functional layer.

Examples of the method of printing the material include screen printing, flexographic printing, and gravure printing. In the printing method, an ink is used which is dried or cured by heat or light before the polyvinyl acetal resin film having the functional layer is laminated in a subsequent step.

Examples of the method of laminating the material include a method of layering a functional layer and a polyvinyl acetal resin film and thermocompression bonding the same; a method of applying a solvent, or a resin composition solution containing a solvent and a resin contained in the polyvinyl acetal resin film, on one or both of the functional layer and the polyvinyl acetal resin film or injecting the solvent or solution between the functional layer and the polyvinyl acetal resin film to bond the functional layer and the polyvinyl acetal resin film; and a method of bonding the functional layer and the polyvinyl acetal resin film with an adhesive. As the adhesive used in the method of bonding using the adhesive, an adhesive generally used in the technical field may be used, and examples thereof include acrylate-based adhesives, urethane-based adhesives, epoxy-based adhesives and hot melt adhesives. In an embodiment in which optically excellent characteristics are required, from the viewpoint that a haze derived from an adhesive hardly occurs or does not occur, a difference in refractive index between the polyvinyl acetal resin film and the adhesive is preferably less than 0.01, more preferably 0.005 or less, and still more preferably 0.003 or less, and a method of bonding the functional layer and the polyvinyl acetal resin film without using an adhesive is most preferred. That is, between a polyvinyl acetal resin film and a functional layer, for example, a conductive layer, it is preferable not to provide an adhesive layer whose refractive index difference with respect to the polyvinyl acetal resin film is 0.01 or more, it is more preferable not to provide an adhesive layer whose refractive index difference with respect to the polyvinyl acetal resin film is more than 0.005, it is still more preferable not to provide an adhesive layer whose refractive index difference with respect to the polyvinyl acetal resin film is more than 0.003, and it is particularly preferable not to provide an adhesive layer between the polyvinyl acetal resin film and the functional layer. Therefore, in one embodiment of the present invention, there is no adhesive layer between the polyvinyl acetal resin film and the functional layer, for example, the conductive layer. The refractive index can be evaluated using an Abbe refractometer.

In an embodiment in which the functional layer is a conductive layer, the ink used in the printing method includes conductive particles and/or conductive fibers. The conductive particles or conductive fibers are not particularly limited. Examples thereof include metal particles (including those in the form of nanowires) (e.g. particles of gold, silver, copper, zinc, iron or aluminum); metal-coated particles or fibers (e.g. silver-plated glass fibers or glass spheres); conductive carbon black, carbon nanotubes, and particles or fibers of graphite or graphene. Furthermore, the conductive particles may be particles of a semiconductor, such as particles of conductive metal oxide, for example, particles of indium-doped tin oxide, indium-doped zinc oxide or antimony-doped tin oxide. From the viewpoint of conductivity, the ink preferably contains silver particles, copper particles and/or carbon nanotubes, and more preferably contains silver particles or copper particles.

In an embodiment in which the conductive layer is based on metal foil, for example, a polyvinyl acetal resin film having the conductive layer can be produced by a method comprising a step of bonding the metal foil and the polyvinyl acetal resin film and a step of forming the conductive layer from the polyvinyl acetal resin film with metal foil obtained in the above step.

The step of bonding the metal foil and the polyvinyl acetal resin film is performed, for example, by the following methods (I) to (III);

(I) a method of layering the polyvinyl acetal resin film and the metal foil and thermocompression bonding the same;

(II) a method of covering and bonding a melt of a resin composition constituting the polyvinyl acetal resin film on the metal foil, for example, a method of melt-extruding the resin composition on the metal foil, or a method of coating the metal foil with the resin composition by knife coating or the like; and (III) a method of applying a solvent, or a resin composition solution or dispersion containing a solvent and a resin contained in the polyvinyl acetal resin film, on one or both of the metal foil and the polyvinyl acetal resin film or injecting the solvent, solution or dispersion between the metal foil and the polyvinyl acetal resin film to bond the metal foil and the polyvinyl acetal resin film.

Although the bonding temperature during thermocompression bonding in the method (I) depends on the type of resin contained in the polyvinyl acetal resin film, the bonding temperature is usually 90 to 170° C., preferably 100 to 160° C., more preferably 110 to 155° C., and still more preferably 110 to 150° C. When the bonding temperature is within the above range, good bonding strength is more easily obtained.

The resin temperature during extrusion in the method (II) is preferably 150 to 250° C. and more preferably 170 to 230° C., from the viewpoint of reducing the content of volatile substances in the polyvinyl acetal resin film. In order to efficiently remove the volatile substances, it is preferable to remove the volatile substances from a vent port of an extruder by reducing the pressure.

As the solvent in the method (III), it is preferable to use a plasticizer which is usually used for polyvinyl acetal resin. As such a plasticizer, those described in the above paragraph <Plasticizer> can be used.

A step of forming a desired shape of the conductive layer from the obtained polyvinyl acetal resin film with the metal foil can be performed using a publicly-known photolithography method. In the step, for example as mentioned in the examples described later, first, a dry film resist is laminated on the metal foil of the polyvinyl acetal resin film with metal foil, and then an etching resistance pattern is formed using a photolithography method, and subsequently, the polyvinyl acetal resin film to which the etching resistance pattern is imparted is immersed in a copper etching solution to form the shape of the conductive layer, and then a remaining photoresist layer is removed by a publicly-known method.

When the polyvinyl acetal resin film having a conductive layer on at least one side thereof has another polyvinyl acetal resin film on the surface having the conductive layer, the another polyvinyl acetal resin film can be bonded onto the surface having the conductive layer, for example, by the above methods (I) to (III).

The above-described production method exemplified in the embodiment in which the conductive layer is based on metal foil can simply and more easily form a conductive layer having a desired shape, so that production efficiency can be significantly improved when the conductive layer is applied to the polyvinyl acetal resin film.

<Laminate>

The present invention also relates to a laminate having a polyvinyl acetal resin film having the functional layer between a plurality of transparent substrates. The polyvinyl acetal resin film may be in direct contact with the transparent substrate.

In the embodiment in which the functional layer is a conductive layer, each linear conductive material of the conductive layer in the laminate is connected to a bus bar. Therefore, in this embodiment, the polyvinyl acetal resin film has a bus bar connected to the conductive layer. As the bus bar, a bus bar generally used in the technical field is used, and preferred examples thereof include a metal foil or a metal plate made of copper, aluminum and silver, a cured product of an ink containing these metals, and a tape of the metal foil thereof having a conductive adhesive layer. When the conductive layer is based on metal foil, the bus bar may be formed by leaving a portion of the metal foil as a bus bar at the same time as forming the shape of the conductive layer. When the conductive layer is formed by a printing method, the bus bar may be formed by printing the bus bar at the same time as printing the shape of the conductive layer. In such a case, the bus bar is integrally formed with the conductive layer. Since power feeders are connected to the bus bars respectively and are connected to a power supply, current is supplied to the conductive layer. Therefore, the present invention also relates to a laminate in which a polyvinyl acetal resin film having a bus bar connected to a conductive layer is provided between a plurality of transparent substrates, the laminate having an electrode connected to the bus bar. In this laminate, the polyvinyl acetal resin film may or may not be in contact with the transparent substrate. However, if it is desired to efficiently heat one of glass plates, it is preferable that the polyvinyl acetal resin film is in direct contact with the transparent substrate (for example, a glass) on the side desired to be heated.

The transparent substrate is preferably organic glass or inorganic glass from the viewpoint of transparency, weatherability, and mechanical strength. Specifically, the transparent substrate is preferably inorganic glass (sometimes referred to simply as "glass" in the present specification), or organic glass such as a methacrylic resin sheet, a polycarbonate resin sheet, a polystyrene-based resin sheet, a polyester-based resin sheet or a polycycloolefin-based resin sheet, more preferably inorganic glass, a methacrylic resin sheet or a polycarbonate resin sheet, and particularly preferably inorganic glass. The inorganic glass is not particularly limited, and examples thereof include float glass, tempered glass, semi-tempered glass, chemically tempered glass, green glass, and quartz glass.

In a case where the laminate has a conductive layer as a functional layer, the conductive layer may be in contact with the transparent substrate, a plasticized polyvinyl acetal resin layer described later, or another functional layer.

In a case where the transparent substrate is a glass, if the conductive layer is in direct contact with the glass, due to insufficient sealing of the bus bar and/or the conductive layer, moisture may intrude to cause corrosion of the bus bar and/or the conductive layer, or air may be left during production of the laminate which provides remaining of bubbles and cause of peeling. Therefore, it is preferable that the conductive layer is not in direct contact with the glass.

Particularly in a vehicle glass, especially a vehicle windshield, in the case of using the polyvinyl acetal resin film of the present invention, from the viewpoint of forward visibility, it is preferable that the conductive layer is arranged such that the surface treated to have low reflectance of the conductive layer is on the side of persons on board.

In a case where the laminate has a conductive layer as a functional layer, water may intrude from an end of the laminate to cause corrosion of the conductive layer. Therefore, it is preferable that the conductive layer is arranged 1 cm or more inward of the end of the laminate.

<Plasticized Polyvinyl Acetal Resin Layer>

The polyvinyl acetal resin film of the present invention can be used solely, but is more preferably used in combination with the plasticized polyvinyl acetal resin layer.

In particular, from the viewpoint of penetration resistance of a laminated glass, it is preferable that one or more plasticized polyvinyl acetal resin layers are arranged in addition to the polyvinyl acetal resin film having the functional layer between the plurality of transparent substrates. That is, in a preferred embodiment, the laminate of the present invention has the polyvinyl acetal resin film having the functional layer or the conductive layer and the plasticized polyvinyl acetal resin layer between the plurality of transparent substrates. In this case, the plasticized polyvinyl acetal resin layer is preferably in direct contact with the polyvinyl acetal resin film of the present invention, and is more preferably in direct contact with the functional layer or the conductive layer of the polyvinyl acetal resin film of the present invention.

The optionally laminated plasticized polyvinyl acetal resin layer contains a polyvinyl acetal resin. Although the content of the polyvinyl acetal resin in the plasticized polyvinyl acetal resin layer is not particularly limited, in an initial state before lamination with the polyvinyl acetal resin film of the present invention, the content of the polyvinyl acetal resin is preferably 84.0% by mass or less and more preferably 60.0 to 83.9% by mass based on the total mass of the resin composition constituting the plasticized polyvinyl acetal resin layer.

The plasticized polyvinyl acetal resin layer may contain one polyvinyl acetal resin or two or more polyvinyl acetal resins which differ from each other in any one or more of a viscosity average polymerization degree, an acetalization degree, an acetyl group amount, a hydroxyl group amount, an ethylene content, a molecular weight of aldehyde used for acetalization, and a chain length.

The polyvinyl acetal resin can be produced by a method similar to the method described in the above paragraph <Resin used to constitute polyvinyl acetal resin film>, for example.

A preferable acetyl group amount in the polyvinyl acetal resin used to constitute the plasticized polyvinyl acetal resin layer is as follows. That is, when a repeat unit is assumed to be a unit comprising two carbon atoms of the main chain in the polyvinyl alcohol resin which is a raw material for producing the polyvinyl acetal resin (for example, a vinyl alcohol unit, a vinyl acetate unit, and an ethylene unit), the vinyl acetate unit is in an amount of preferably 0.1 to 20 mol % and more preferably 0.5 to 3 mol % or 5 to 8 mol % based on the repeat unit. The acetyl group amount can be adjusted within the above range by appropriately adjusting the saponification degree of the polyvinyl alcohol-based resin of the raw material. When the plasticized polyvinyl acetal resin layer contains the polyvinyl acetal resin in which the acetyl group amount is within the above range, a plasticized polyvinyl acetal resin layer having excellent compatibility with a plasticizer is more easily obtained. When the plasticized polyvinyl acetal resin layer contains two or more different polyvinyl acetal resins, the acetyl group amount of at least one polyvinyl acetal resin is preferably within the above range.

The acetalization degree of the polyvinyl acetal resin is not particularly limited. The acetalization degree is preferably 40 to 86 mol %, more preferably 45 to 84 mol %, more preferably 50 to 82 mol %, still more preferably 60 to 82 mol %, and particularly preferably 68 to 82 mol %. The acetalization degree of the polyvinyl acetal resin can be adjusted within the above range by appropriately adjusting the amount of aldehyde used in acetalizing the polyvinyl alcohol-based resin. When the acetalization degree is within the above range, it is easy to obtain a plasticized polyvinyl acetal resin layer excellent in penetration resistance or bondability with a glass in a laminated glass. In a case where the plasticized polyvinyl acetal resin layer contains two or more different polyvinyl acetal resins, the acetalization degree of at least one polyvinyl acetal resin is preferably within the above range.

The hydroxyl group amount of the polyvinyl acetal resin is preferably 6 to 26% by mass, more preferably 12 to 24% by mass, more preferably 15 to 22% by mass, and particularly preferably 18 to 21% by mass as the mass of the vinyl alcohol unit. When a repeat unit is assumed to be a unit comprising two carbon atoms of the main chain in the polyvinyl alcohol resin which is a raw material for producing the polyvinyl acetal resin (for example, a vinyl alcohol unit, a vinyl acetate unit, and an ethylene unit), the vinyl alcohol unit is preferably 9 to 36 mol %, more preferably 18 to 34 mol %, further preferably 22 to 34 mol %, yet further preferably 26 to 34 mol %, particularly preferably 26 to 31 mol %, and extremely preferably 26 to 30 mol % based on the repeat unit. When the hydroxyl group amount is within the above range, a laminated glass excellent in penetration resistance, bondability, or sound insulation is more easily obtained. On the other hand, in order to additionally impart sound insulation performance, the preferable range is 6 to 20% by mass, more preferably 8 to 18% by mass, still more preferably 10 to 15% by mass, and particularly preferably 11 to 13% by mass, and the preferable range is 9 to 29 mol %, more preferably 12 to 26 mol %, still more preferably 15 to 23 mol %, and particularly preferably 16 to 20 mol %. The hydroxyl group amount can be adjusted within the above range by adjusting the amount of aldehyde used in acetalizing the polyvinyl alcohol-based resin. When the plasticized polyvinyl acetal resin layer contains two or more different polyvinyl acetal resins, the hydroxyl group amount of at least one polyvinyl acetal resin is preferably within the above range.

The polyvinyl acetal resin can be measured by the "Testing Methods for Polyvinyl Butyral" of JIS K 6728 or a nuclear magnetic resonance method (NMR).

The plasticized polyvinyl acetal resin layer preferably contains uncrosslinked polyvinyl acetal from the viewpoint of more easily obtaining good film forming properties and laminatability, and from the viewpoint of more easily reducing head impact at the time of collision in a vehicle glass comprising the plasticized polyvinyl acetal resin layer. The plasticized polyvinyl acetal resin layer may contain cross-linked polyvinyl acetal. A method for cross-linking polyvinyl acetal is exemplified in the above paragraph <Resin used to constitute polyvinyl acetal resin film>.

The plasticized polyvinyl acetal resin layer contains a plasticizer in addition to the polyvinyl acetal resin. In an initial state before lamination of layers, the content of the plasticizer is preferably 16.0% by mass or more, more preferably 16.1 to 36.0% by mass, still more preferably 22.0 to 32.0% by mass, and particularly preferably 26.0 to 30.0% by mass based on the total mass of the resin composition constituting the plasticized polyvinyl acetal resin layer. When the plasticizer content is within the above range, a laminated glass excellent in impact resistance is more easily obtained. As the plasticized polyvinyl acetal resin layer, a plasticized polyvinyl acetal resin layer which has a sound insulation function can also be used. In this case, it is possible to use at least one layer in which in the initial state before lamination of layers, the content of the plasticizer is preferably 30% by mass or more, more preferably 30 to 50% by mass, still more preferably 31 to 40% by mass, and particularly preferably 32 to 35% by mass based on the total mass of the resin composition constituting the plasticized polyvinyl acetal resin layer.

As the plasticizer, the plasticizer described in the above paragraph <Plasticizer> above may be used.

The plasticized polyvinyl acetal resin layer may optionally contain the additive described in the above paragraph <Additive>. The total amount of the polyvinyl acetal resin and the plasticizer in the resin composition constituting the plasticized polyvinyl acetal resin layer is preferably 90% by mass or more based on the total mass of the resin composition.

The plasticized polyvinyl acetal resin layer may have a wedge-shaped thickness profile. Consequently, the laminate of the present invention can have the wedge-shaped thickness profile even when the thickness profile of the polyvinyl acetal resin film is a parallel plane, and the laminate can be used for a head-up display (HUD) in automobile windshields.

The plasticized polyvinyl acetal resin layer may be a commercially available plasticized polyvinyl butyral sheet with or without a color shade, and with or without the wedge-shaped thickness profile. Similarly, a plasticized polyvinyl acetal resin layer having infrared absorbing or reflecting nanoparticles dispersed in a plasticized polyvinyl acetal resin layer for infrared shielding, or a colored plasticized polyvinyl acetal resin layer may be used. Since the plasticized polyvinyl acetal resin layer may be naturally a sheet having a sound insulation function, improved sound insulation properties can be obtained by combination with the polyvinyl acetal resin film. The plasticized polyvinyl acetal resin layer can also naturally integrate several of the previously described functions in itself. Therefore, in one embodiment of the present invention, the plasticized polyvinyl acetal resin layer has at least one function selected from the group consisting of a specific wavelength light shielding function, a heat shielding function, a sound insulating function, a light emitting function, a display function and a double image prevention function.

<Method of Producing Plasticized Polyvinyl Acetal Resin Layer>

The plasticized polyvinyl acetal resin layer may be produced by the method described in the above paragraph <Method of producing polyvinyl acetal resin film>.

In the laminate of the present invention, a difference between the hydroxyl group amount of the polyvinyl acetal resin in the resin composition constituting the polyvinyl acetal resin film and the hydroxyl group amount of the polyvinyl acetal resin in the resin composition constituting the plasticized polyvinyl acetal resin layer is preferably 4% by mass or less, more preferably 3% by mass or less, more preferably 2% by mass or less, and particularly preferably 1% by mass or less as percentage by mass of vinyl alcohol units. As the mole percentage of the vinyl alcohol unit, it is preferably 6 mol % or less, more preferably 4 mol % or less, and particularly preferably 3 mol % or less. In a case where the resin composition constituting the polyvinyl acetal resin film and/or the resin composition constituting the plasticized polyvinyl acetal resin layer contain a mixture of plural resins, a difference between the hydroxyl group amount of at least one polyvinyl acetal resin contained in the polyvinyl acetal resin film and the hydroxyl group amount of at least one polyvinyl acetal resin contained in the plasticized polyvinyl acetal resin layer is preferably equal to or less than the above upper limit value. When the difference is equal to or less than the above upper limit value, a difference in refractive index between the polyvinyl acetal resin film and the plasticized polyvinyl acetal resin layer is reduced in an equilibrium state after transfer of the plasticizer in the laminate. Therefore, when the plasticized polyvinyl acetal resin layer and the polyvinyl acetal resin film which have different dimensions are used, the boundary is less visible, and thus it is preferable.

On the other hand, as a preferred embodiment, the hydroxyl group amount of the polyvinyl acetal resin in the resin composition constituting the polyvinyl acetal resin film is set to be smaller than the hydroxyl group amount of the polyvinyl acetal resin in the resin composition constituting the plasticized polyvinyl acetal resin layer, so that an average plasticizer amount in the polyvinyl acetal resin film in the equilibrium state after transfer of the plasticizer in the laminate is set to 30% by mass or more. In this case, the hydroxyl group amount of the polyvinyl acetal resin in the resin composition constituting the polyvinyl acetal resin film is preferably lower by 5% by mass or more, more preferably lower by 8% by mass or more, and preferably lower by 6 mol % or more, more preferably lower by 10 mol % or more than the hydroxyl group amount of the polyvinyl acetal resin in the resin composition constituting the plasticized polyvinyl acetal resin layer. When the difference in the hydroxyl group amount is equal to or more than the above lower limit value, the amount of the plasticizer of the polyvinyl acetal resin film in the equilibrium state can be sufficiently increased, and a laminated glass imparted with the sound insulation function is more easily obtained, which is preferable.

Although the laminate in the present invention can have the following layer structure, the present invention is not limited thereto.

(1) four-layer structure consisting of transparent substrate A/polyvinyl acetal resin film/functional layer A/transparent substrate B, (2) five-layer structure consisting of transparent substrate A/polyvinyl acetal resin film/functional layer A/functional layer B/transparent substrate B (3) five-layer structure consisting of transparent substrate A/functional layer B/polyvinyl acetal resin film/functional layer A/transparent substrate B, (4) five-layer structure consisting of transparent substrate A/polyvinyl acetal resin film/functional layer A/plasticized polyvinyl acetal resin layer/transparent substrate B, (5) five-layer structure consisting of transparent substrate A/plasticized polyvinyl acetal resin layer/polyvinyl acetal resin film/functional layer A/transparent substrate B, (6) six-layer structure consisting of transparent substrate A/plasticized polyvinyl acetal resin layer/polyvinyl acetal resin film/functional layer A/plasticized polyvinyl acetal resin layer/transparent substrate B, (7) six-layer structure consisting of transparent substrate A/functional layer B/polyvinyl acetal resin film/functional layer A/plasticized polyvinyl acetal resin layer/transparent substrate B, (8) six-layer structure consisting of transparent substrate A/polyvinyl acetal resin film/functional layer A/functional layer B/plasticized polyvinyl acetal resin layer/transparent substrate B, (9) six-layer structure consisting of transparent substrate A/polyvinyl acetal resin film/functional layer A/plasticized polyvinyl acetal resin layer/functional layer B/transparent substrate B,

(10) six-layer structure consisting of transparent substrate A/functional layer B/plasticized polyvinyl acetal resin layer/polyvinyl acetal resin film/functional layer A/transparent substrate B,

(11) six-layer structure consisting of transparent substrate A/plasticized polyvinyl acetal resin layer/polyvinyl acetal resin film/functional layer A/functional layer B/transparent substrate B,

(12) seven-layer structure consisting of transparent substrate A/plasticized polyvinyl acetal resin layer/polyvinyl acetal resin film/functional layer A/functional layer B/plasticized polyvinyl acetal resin layer/transparent substrate B,

(13) seven-layer structure consisting of transparent substrate A/functional layer B/plasticized polyvinyl acetal resin layer/polyvinyl acetal resin film/functional layer A/plasticized polyvinyl acetal resin layer/transparent substrate B,

(14) seven-layer structure consisting of transparent substrate A/plasticized polyvinyl acetal resin layer/functional layer B/polyvinyl acetal resin film/functional layer A/plasticized polyvinyl acetal resin layer/transparent substrate B.

(15) A laminate having a layer structure in which when the functional layer A is a conductive layer, in the layer structures (1) to (14), "polyvinyl acetal resin film/functional layer A" is replaced with "polyvinyl acetal resin film/functional layer A/another polyvinyl acetal resin film".

In a case where heating a transparent substrate outside a vehicle is mainly required, for example in a case where melting snow deposited on the transparent substrate is required, it is preferable that the polyvinyl acetal resin film is in contact with the transparent substrate outside the vehicle and the conductive layer is present, that is, in the layer structure (4), for example, while the transparent substrate A is an outside transparent substrate, the transparent substrate B is an inside transparent substrate, and the functional layer A is a conductive layer.

In a case where heating a transparent substrate inside a vehicle is mainly required, for example in a case where removal of haze in the vehicle is required, it is preferable that the polyvinyl acetal resin film is in contact with the transparent substrate inside the vehicle and the conductive layer is present, that is, in the layer structure (4), for example, while the transparent substrate A is an inside transparent substrate, the transparent substrate B is an outside transparent substrate, and the functional layer A is a conductive layer.

<Method of Producing Laminate>

The laminate can be produced by methods known to those skilled in the art. For example, any number of the polyvinyl acetal resin film having a functional layer and, if laminated, any number of the plasticized polyvinyl acetal resin layer are laminated on the transparent substrate in any order, and another transparent substrate is laminated thereon. The temperature of the obtained material is raised as a pre-thermocompression step, and thereby, the polyvinyl acetal resin film and, if laminated, the plasticized polyvinyl acetal resin layer are entirely or locally bonded to the transparent substrates through thermal fusion. Then, the bonded product is treated with an autoclave, and then a laminate can be produced.

A laminate may be produced by previously bonding the polyvinyl acetal resin film having a functional layer and, if laminated, the plasticized polyvinyl acetal resin layer and/or another functional layer, arranging between two transparent substrates, and then bonding through thermal fusion at high temperature.

As the pre-thermocompression step, from the viewpoint of removing excess air or carrying out light bonding between adjacent layers, there are a method of degassing under reduced pressure by a method such as a vacuum bag, a vacuum ring, or a vacuum laminator, a method of degassing using a nip roll, and a method of compression molding under high temperature conditions.

For example, the vacuum bag method or vacuum ring method described in EP 1235683 B1 can be performed, for example, at about $2 \times 10^4$ Pa and 130 to 145° C.

The vacuum laminator comprises a heatable and vacuumable chamber, in which a laminate is formed for about 20 minutes to about 60 minutes. Usually, a reduced pressure of 1 Pa to $3 \times 10^4$ Pa and a temperature of 100° C. to 200° C., particularly 130° C. to 160° C., are effective. In a case where the vacuum laminator is used, depending on the temperature and pressure, treatment with an autoclave may not be performed.

The treatment with an autoclave is carried out, for example, at a pressure of about $1 \times 10^6$ Pa to about $1.5 \times 10^6$ Pa and a temperature of about 100° C. to about 145° C. for about 20 minutes to 2 hours.

In the case of the simplest layer structure, in order to produce a laminate, a polyvinyl acetal resin film and a functional layer are arranged or a polyvinyl acetal resin film to which the functional layer is provided in advance is arranged on a first transparent substrate and, if laminated, a plasticized polyvinyl acetal resin layer is simultaneously or subsequently arranged, and a second transparent substrate is arranged thereon to produce a composite material. Here, the order of the polyvinyl acetal resin film and the plasticized polyvinyl acetal resin layer may be reversed. Next, the composite material is subjected to the pre-thermocompression step. A degassing step may be optionally comprised.

Finally, the composite material is optionally subjected to an autoclave process.

After arranging the polyvinyl acetal resin film on the first transparent substrate and before arranging the second transparent substrate, a method of arranging the polyvinyl acetal resin layer and, if laminated, the plasticized polyvinyl acetal resin layer is not particularly limited, and various methods can be applied. For example, the polyvinyl acetal resin film and the plasticized polyvinyl acetal resin layer may be supplied from a roll having a proper width, and may be cut to a desired size to arrange, or the film previously cut to a desired size may be arranged. For example, in a case where the laminate is an automobile windshield, the plasticized polyvinyl acetal resin layer supplied from a roll may be heated/drawn, cut, and processed into a fan shape, and the resulting layer may be used.

In the fields of automobiles, in particular when windshields are produced, the windshields are sometimes produced such that the top of the glass has a so-called color shade region. Thus, the polyvinyl acetal resin film and/or, if laminated, the plasticized polyvinyl acetal resin layer may be coextruded together with a properly colored polymer melt, or at least one of the polyvinyl acetal resin film and the plasticized polyvinyl acetal resin layer may have a partially different coloration characteristic. In the present invention, such coloring may be carried out by completely or partially coloring at least one of the polyvinyl acetal resin film and the plasticized polyvinyl acetal resin layer.

Thus, in the present invention, the plasticized polyvinyl acetal resin layer if laminated may have a color gradation adapted to the shape of the windshield, in particular in process steps already preceded.

When a portion of a glass, for example, the top of a glass in a vehicle has the color shade region, or when a peripheral edge portion of the glass is provided with a dark paint, from the viewpoint of more easily obtaining better forward visibility, it is preferable that a linear conductive material constituting a conductive layer, a bus bar connected to the linear conductive material, and the like are present in the color shade region or in the dark paint region.

The laminate of the present invention is used as laminated glass in buildings or vehicles. Thus, the present invention also relates to a vehicle glass comprising the laminate. The vehicle glass means a windshield, a rear glass, a roof glass, a side glass or the like for a vehicle such as a train, a tram, a car, a ship and an aircraft.

When a laminated glass produced using the polyvinyl acetal resin film of the present invention and a conductive layer whose at least one side has been subjected to low reflectance treatment (e.g. blackening treatment) as a functional layer is irradiated with light on the surface treated to have low reflectance (e.g. blackened surface) side, the haze is usually 2.0 or less, preferably 1.8 or less, and more preferably 1.5 or less. When light is applied on a metallic luster surface of the laminated glass described above, the haze is usually 3.0 or less, preferably 2.8 or less, and more preferably 2.5 or less.

The haze can be measured, for example, according to JIS R 3106. The haze can be adjusted to equal to or less than the above upper limit value by using the polyvinyl acetal resin film of the present invention, bonding metal foil without an adhesive agent, and reducing the linear width of the linear conductive material.

When a laminated glass is produced using the polyvinyl acetal resin film of the present invention and a conductive layer whose at least one side has been subjected to low reflectance treatment as a functional layer, it is preferable that the linear conductive material of the conductive layer is not visible from the low reflectance treated surface side of the laminated glass. Due to the fact that the linear conductive material is not visible, especially in applications where good forward visibility of a vehicle windshield or the like is required, the laminated glass can be suitably used. The visibility of the conductive layer is evaluated sensually.

When a laminated glass is produced using a plasticized polyvinyl acetal resin layer, transparent substrates, and the polyvinyl acetal resin film of the present invention having a smaller dimension than them, it is preferable that an end of the polyvinyl acetal resin film is not visually identified. Due to the fact that the end of the polyvinyl acetal resin film is not visually identified, the laminated glass can be suitably used especially in applications where good forward visibility of a vehicle windshield or the like is required. The visibility of the end of the polyvinyl acetal resin film is evaluated sensually.

When transfer of the plasticizer from the plasticized polyvinyl acetal resin layer to the polyvinyl acetal resin film is not inhibited in a laminated glass, for example, when a laminated glass is produced by lamination such that the polyvinyl acetal resin film of the present invention and the plasticized polyvinyl acetal resin layer are entirely or partially adjacent to each other, usually, the plasticizer contained in the plasticized polyvinyl acetal resin layer transfers to the polyvinyl acetal resin film with the passage of time, and the amount of the plasticizer contained in the plasticized polyvinyl acetal resin layer is approximately the same as the amount of the plasticizer contained in the polyvinyl acetal resin film. In the present invention, such an average plasticizer amount is preferably 18 to 35% by mass, more preferably 20 to 30% by mass, and particularly preferably 25 to 29% by mass. When the average plasticizer amount is within the above range, desired characteristics of the laminated glass, for example, an impact reduction on a head of a person on board at the time of collision, are more easily obtained. The average plasticizer amount is calculated by the method mentioned in the examples described later. The average plasticizer amount can be adjusted within the above range by adjusting the amount of the plasticizer contained in the plasticized polyvinyl acetal resin layer, the thickness of the plasticized polyvinyl acetal resin layer, the amount of the plasticizer contained in the polyvinyl acetal resin film, and the thickness of the polyvinyl acetal resin film.

A difference between the visible light reflectance of the laminated glass comprising the conductive layer of the present invention and the visible light reflectance of the laminated glass corresponding to the laminated glass of the present invention except that the conductive layer is not comprised is preferably small. When the difference is small, especially in applications where good forward visibility of a vehicle windshield or the like is required, the laminated glass comprising the conductive layer in the present invention can be suitably used. The visible light reflectance of the laminated glass can be measured according to JIS R 3106. The difference can be reduced by configuring the laminated glass such that the surface treated to have low reflectance of the conductive layer is arranged on the side of a person on board or the observer side, or reducing the line width of the linear conductive material.

EXAMPLES

The present invention is hereunder described in more detail with reference to Examples, but it should be construed that the present invention is by no means restricted by these Examples.

Example 1

A polyvinyl butyral resin 1 (hereinafter referred to as "resin 1") and a polyvinyl butyral resin 2 (hereinafter referred to as "resin 2") were blended at a mass ratio of 75:25, melt-kneaded to be extruded into strands, and pelletized. The obtained pellets were melt-extruded using a single screw extruder and a T-die, and a 50 μm-thick polyvinyl acetal resin film c with a smooth surface was obtained using a metal elastic roll.

<Evaluation of Film Forming Property of Polyvinyl Acetal Resin Film>

The film forming property when the pellets were melt-extruded by a single screw extruder was evaluated based on the following criteria. The results are shown in Table 2.
A The film forming property was very good.
B Film formation was good.
C Coloring and generation of decomposition gas occurred, but film formation was possible.
D Film formation was impossible.

<Measurement of Peak Top Molecular Weight and Molecular Weight Distribution of Resin for Constituting Polyvinyl Acetal Resin Film>

The resin for constituting the polyvinyl acetal resin film was analyzed by GPC. For the GPC analysis, GPCmax TDA 305 from Viscotek Corporation and a RI detector were used as analyzers, and two connected GPC KF-806L from Shodex, a tip of which was further connected to KF-G from Shodex as a guard, were used as columns, a THF solvent and standard polystyrene (Easical GPC/SEC Calibration Standards PS-1 manufactured by Agilent Technologies, Inc.) were used, and OmniSE, C4.7 was used as analysis software. Measurement was carried out at 40° C. and an injection amount of 100 μL to determine the peak top molecular weight and molecular weight distribution of the resin. The results are shown in Table 2.

<Measurement of Heat Creep Resistance Value (1) and Heat Creep Resistance Value (2)>

The heat creep resistance value (1) and the heat creep resistance value (2) of the polyvinyl acetal resin film were measured according to the methods described in the above paragraphs <Method (1) of measuring heat creep resistance value (1)> and <Method (2) of measuring heat creep resistance value (2)>, respectively. The results are shown in Table 2.

Physical property values of a resin A or C used as the resin 1 and a resin B used as the resin 2 in Example 1 and Examples 2 to 6 and Comparative Examples 1 to 4 described later are shown in Table 1.

TABLE 1

| Resin | Hydroxyl group amount (mass %) | Acetalization degree (mass %) | Acetyl group amount (mass %) | Viscosity of 10% by mass solution in toluene/ethanol = 1/1 (mPa · s) |
|---|---|---|---|---|
| A | 19.8 (28.5 mol %) | 79.2 (70.8 mol %) | 1.0 (0.7 mol %) | 152 |
| B | 20.1 (28.9 mol %) | 79.0 (70.4 mol %) | 0.9 (0.7 mol %) | 1410 |
| C | 19.7 (28.4 mol %) | 79.2 (70.8 mol %) | 1.1 (0.8 mol %) | 65 |

Examples 2 to 3 and Comparative Example 1

50 μm-thick polyvinyl acetal resin films d, e, and a with a smooth surface were produced in the same manner as in Example 1 except that a mixing ratio between the resin 1 and the resin 2 was changed to the ratio described in Table 2.

Then, the film forming properties of the polyvinyl acetal resin film were evaluated in the same manner as in Example 1, the peak top molecular weight and the molecular weight distribution of the resin for constituting the polyvinyl acetal resin film were determined, and the heat creep resistance value (1) and the heat creep resistance value (2) were measured. The results are shown in Table 2.

TABLE 2

| | Polyvinyl acetal resin film | Resin 1 | Resin 2 | Resin 1:Resin 2 (mass ratio) | Viscosity of 10% by mass solution of resin in toluene/ethanol = 1/1 (mPa · s) | | |
|---|---|---|---|---|---|---|---|
| | | | | | Resin 1 | Resin 2 | Resin 1 + Resin 2 |
| Example 1 | c | A | B | 75:25 | 152 | 1410 | 245 |
| Example 2 | d | A | B | 50:50 | 152 | 1410 | 444 |
| Example 3 | e | A | B | 25:75 | 152 | 1410 | 783 |
| Comparative Example 1 | a | A | — | 100:0 | 152 | — | — |

TABLE 2-continued

|  | Thickness of the film (μm) | Film forming properties | GPC analysis of resin for constituting the resin film | | Heat creep resistance value (1) (mm) | Heat creep resistance value (2) (mm) |
| --- | --- | --- | --- | --- | --- | --- |
|  |  |  | Peak top molecular weight | Molecular weight distribution Mw/Mn |  |  |
| Example 1 | 50 | A | 129,000 | 2.9 | 3.8 | 3.6 |
| Example 2 | 50 | B | 147,000 | 3.2 | 0.8 | 0.9 |
| Example 3 | 50 | C | 162,200 | 3.1 | 0.7 | 0.6 |
| Comparative Example 1 | 50 | A | 111,700 | 2.5 | >30 | >30 |

As shown in Table 2, when the polyvinyl acetal resin film of the present invention was produced using a resin in which the viscosity of the 10% by mass solution of the resin in toluene/ethanol=1/1 (by mass ratio) was more than 200 mPa·s (Examples 1 to 3), excellent heat creep resistance value (1) and heat creep resistance value (2) were obtained. This indicates that when the laminated glass is produced using such a polyvinyl acetal resin film of the present invention, deformation and destruction of the functional layer or the conductive layer are well suppressed, and misalignment of obtained laminated glass under high temperature conditions is well suppressed.

On the other hand, when a polyvinyl acetal resin film was produced using a resin in which the viscosity of the 10% by mass solution of the resin in toluene/ethanol=1/1 (by mass ratio) was 200 mPa·s or less (Comparative Example 1), only the heat creep resistance value (1) and the heat creep resistance value (2) more than 30 mm were obtained. When the laminated glass was produced using such a polyvinyl acetal resin film, deformation and destruction of the functional layer or the conductive layer are not sufficiently suppressed, and misalignment of obtained laminated glass under high temperature conditions is not sufficiently suppressed.

Example 4

A UV-curable nano-silver ink was printed on the polyvinyl acetal resin film c by a letterpress printing method to a thickness of 10 μm, and a linear conductive material pattern having 20 lines with a line width of 300 μm, a pitch of 100 μm, and a length of 5 cm was formed. The pattern was irradiated with UV light to cure the ink.

Next, the polyvinyl acetal resin film provided with the pattern was arranged on a glass of 10 cm long, 10 cm wide, and 3 mm thick so that a printed surface faced upward, and a copper foil tape (5 mm wide and 15 cm long) having a conductive adhesive layer as a bus bar was applied so as to overlap with both ends of each linear conductive material at a right angle to the direction of the linear conductive material of the pattern. Each end of the bus bar protruded from the polyvinyl acetal resin film and was used as an electrode. Subsequently, as a plasticized polyvinyl acetal resin layer, an interlayer film for automobile windshields of 10 cm long, 10 cm wide, and 0.76 mm thick [containing polyvinyl butyral resin (72% by mass) having a hydroxyl group amount of 20.0% by mass and a viscosity average polymerization degree of 1700 and 3GO (28% by mass)] was layered thereon, and a glass of 10 cm long, 10 cm wide, and 3 mm thick was further layered and fixed with a tape. At this time, the linear conductive material pattern was arranged at the center of the glass, and each electrode end was arranged so as to protrude from a glass end.

Subsequently, the obtained laminated material was placed in a vacuum bag, treated at 100° C. under reduced pressure for 30 minutes. After cooling, the reduced pressure was released, and a laminated glass after prelamination was taken out. For four sheets of the laminated glass in total after prelamination which were obtained in the same manner, a state of a portion in contact with an end of the bus bar was observed, and the presence or absence of cracking or deformation was confirmed.

Thereafter, the laminated glass after prelamination was put into an autoclave and treated at 140° C. and 1.2 MPa for 30 minutes. The obtained laminated glass after autoclaving was observed in the same manner as described above.

The presence or absence of cracking or deformation after prelamination and after autoclaving was evaluated based on the following criteria. The results are shown in Table 3.

A: Cracking or deformation of a linear conductive material was not observed

B: Some deformation was observed, but no cracking in the linear conductive material was observed, which was practicable.

C: Cracking and deformation were observed in some linear conductive materials.

D: Cracking and deformation were observed in many linear conductive materials, which was not practical.

Examples 5 and 6 and Comparative Examples 2 to 4

A laminated glass was produced and evaluated in the same manner as in Example 4 except that the polyvinyl acetal resin film shown in Table 3 was used.

TABLE 3

|  | Polyvinyl acetal resin film | Resin 1 | Resin 2 | Resin 1:Resin 2 (mass ratio) | Viscosity of 10% by mass solution of resin in toluene/ethanol = 1/1 (mPa · s) | | | Thickness of the film (μm) |
| --- | --- | --- | --- | --- | --- | --- | --- | --- |
|  |  |  |  |  | Resin 1 | Resin 2 | Resin 1 + Resin 2 |  |
| Example 4 | c | A | B | 75:25 | 152 | 1410 | 245 | 50 |
| Example 5 | d | A | B | 50:50 | 152 | 1410 | 444 | 50 |
| Example 6 | e | A | B | 25:75 | 152 | 1410 | 783 | 50 |

TABLE 3-continued

| | | | | | | | | |
|---|---|---|---|---|---|---|---|---|
| Comparative Example 2 | b | C | — | 100:0 | 65 | — | — | 50 |
| Comparative example 3 | a | A | — | 100:0 | 152 | — | — | 50 |
| Comparative example 4 | m | A | B | 75:25 | 152 | 1410 | 245 | 50 |

| | Plasticizer (mass %) | Coating thickness of UV-curable nano-silver ink (μm) | Line width (μm) | Pitch (μm) | State of conductive layer After prelamination | State of conductive layer After autoclaving |
|---|---|---|---|---|---|---|
| Example 4 | 0 | 10 | 300 | 100 | A | B |
| Example 5 | 0 | 10 | 300 | 100 | A | A |
| Example 6 | 0 | 10 | 300 | 100 | A | A |
| Comparative Example 2 | 0 | 10 | 300 | 100 | C | D |
| Comparative example 3 | 0 | 10 | 300 | 100 | B | C |
| Comparative example 4 | 22 | 10 | 300 | 100 | B | C |

As shown in Table 3, in a case where a resin in which the viscosity of the 10% by mass solution of the resin in toluene/ethanol=1/1 (by mass ratio) was more than 200 mPa·s was used, the amount of the plasticizer in the polyvinyl acetal resin film was 0 to 20% by mass based on the total mass of the resin composition constituting the polyvinyl acetal resin film, and the polyvinyl acetal resin film of the present invention was produced (Examples 4 to 6), no cracking was observed in the linear conductive material of the conductive layer after prelamination and after autoclaving, which was practicable.

On the other hand, in a case where the polyvinyl acetal resin film was produced by use of a resin in which the viscosity of the 10% by mass solution of the resin in toluene/ethanol=1/1 (by mass ratio) was 200 mPa·s or less (Comparative Examples 2 to 3), and in a case where the amount of the plasticizer in the polyvinyl acetal resin film was 22% by mass based on the total mass of the resin composition constituting the polyvinyl acetal resin film (Comparative Example 4), deformation, or deformation and cracking were observed in the linear conductive material of the conductive layer after prelamination, and deformation and cracking were observed in the linear conductive material of the conductive layer after autoclaving, which were not practical.

<Production of Polyvinyl Acetal Resin Films a to m and o, p and q>

A polyvinyl butyral resin 1 (hereinafter referred to as "resin 1") was melt-kneaded, or the resin 1 and a polyvinyl butyral resin 2 (hereinafter referred to as "resin 2") were melt-kneaded at a mass ratio described in Table 5 or 8. When the polyvinyl acetal resin film contained a plasticizer (polyvinyl acetal resin films j and m), a predetermined amount of 3GO as a plasticizer was melt-kneaded together with the resin 1 and the resin 2. Next, the obtained melt-kneaded product was extruded into strands and pelletized. The obtained pellet was melt-extruded using a single screw extruder and a T-die, and a polyvinyl acetal resin film with a smooth surface was obtained using a metal elastic roll. The thicknesses of the polyvinyl acetal resin films a to m are shown in Table 5, and the thicknesses of the polyvinyl acetal resin films o, p and q are shown in Table 8.

Physical property values of the resin 1 and the resin 2 used in the production of the polyvinyl acetal resin films a to m and the production of the polyvinyl acetal resin films o, p and q are shown in Table 4.

TABLE 4

| Polyvinyl acetal resin film | Resin | Hydroxyl group amount (mass %) | Acetalization degree (mass %) | Acetyl group amount (mass %) | Viscosity of 10% by mass solution in toluene/ethanol = 1/1 (mPa·s) |
|---|---|---|---|---|---|
| a, c to j, m, o, p and q | 1 | 19.8 (28.5 mol %) | 79.2 (70.8 mol %) | 1.0 (0.7 mol %) | 152 |
| b | 1 | 19.7 (28.4 mol %) | 79.2 (70.8 mol %) | 1.1 (0.8 mol %) | 65 |
| k | 1 | 18.2 (26.5 mol %) | 80.6 (72.6 mol %) | 1.2 (0.9 mol %) | 140 |
| l | 1 | 25.8 (36.0 mol %) | 73.1 (63.2 mol %) | 1.1 (0.8 mol %) | 210 |
| c to j, m, o, p and q | 2 | 20.1 (28.9 mol %) | 79.0 (70.4 mol %) | 0.9 (0.7 mol %) | 1410 |

Example 7

<Production of Polyvinyl Acetal Resin Film with Copper Foil Bonded>

A 7 μm thick copper foil whose one surface was blackened was layered on the produced polyvinyl acetal resin film c in such an orientation that the surface subjected to blackening (hereinafter may be referred to as the blackened surface) and the polyvinyl acetal resin film c were in contact with each other. Here, the visible light reflectance of the blackened surface measured according to JIS R 3106 was 5.2%. Next, the upper and lower sides of the layered product in which the polyvinyl acetal resin film c and the copper foil were layered were sandwiched between 50 μm thick PET films, and the layered product was passed between thermocompression bonding rolls set at 120° C. (pressure: 0.2 MPa, speed: 0.5 m/min). Then, the PET films were peeled off to obtain a polyvinyl acetal resin film to which the copper foil was bonded.

<Production of Polyvinyl Acetal Resin Film Having Conductive Layer>

After a dry film resist was laminated on the copper foil of the produced polyvinyl acetal resin film to which the copper foil was bonded, an etching resistance pattern was formed using a photolithography method. Next, the polyvinyl acetal resin film to which the copper foil was bonded and on which the etching resistance pattern was formed was immersed in a copper etching solution to form a conductive layer (electrically conductive structure), and then a remaining photoresist layer was removed by a conventional method. Thus, a polyvinyl acetal resin film having the conductive layer was obtained. This polyvinyl acetal resin film does not have an adhesive layer between the polyvinyl acetal resin film and the conductive layer. The conductive layer had a copper mesh structure in which copper wires having a line width of 10 μm were arranged in a grid at intervals of 500 μm in a square of 5 cm×5 cm, and had a structure in which the upper and lower sides were connected to a copper wire structure with a width of 5 mm corresponding to a bus bar.

Examples 8 to 14 and Comparative Examples 5 and 6

A polyvinyl acetal resin film having a conductive layer was obtained in the same manner as in Example 7 except that the polyvinyl acetal resin films d to j, a and b described in Table 5 were used instead of the polyvinyl acetal resin film c.

Example 15

A polyvinyl acetal resin film having a conductive layer was obtained in the same manner as in Example 7 except that a 7 μm thick copper foil whose one side was blackened was layered in such an orientation that a metallic luster surface and the polyvinyl acetal resin film c were in contact with each other. Here, the visible light reflectance of the metallic luster surface measured according to JIS R 3106 was 63%.

Example 16

A polyvinyl acetal resin film having a conductive layer was obtained in the same manner as in Example 7 except that a line width of a photomask used for photolithography was changed. The conductive layer had a copper mesh structure in which copper wires having a line width of 5 μm were arranged in a grid at intervals of 500 μm in a square of 5 cm×5 cm, and had a structure in which the upper and lower sides were connected to a copper wire structure with a width of 5 mm corresponding to a bus bar.

Example 17

A polyvinyl acetal resin film having a conductive layer was obtained in the same manner as in Example 16 except that a line width of a copper wire was adjusted to 20 μm. The conductive layer had a copper mesh structure in which copper wires having a line width of 20 μm were arranged in a grid at intervals of 1000 pin in a square of 5 cm×5 cm, and had a structure in which the upper and lower sides were connected to a copper wire structure with a width of 5 mm corresponding to a bus bar.

Example 18

A polyvinyl acetal resin film having a conductive layer was obtained in the same manner as in Example 16 except that a line width of a copper wire was adjusted to 30 μm. The conductive layer had a copper mesh structure in which copper wires having a line width of 30 μm were arranged in a grid at intervals of 1500 μm in a square of 5 cm×5 cm, and had a structure in which the upper and lower sides were connected to a copper wire structure with a width of 5 mm corresponding to a bus bar.

Example 19

A polyvinyl acetal resin film having a conductive layer was obtained in the same manner as in Example 16 except that a line width of a copper wire was adjusted to 40 μm. The conductive layer had a copper mesh structure in which copper wires having a line width of 40 μm were arranged in a grid at intervals of 2000 μm in a square of 5 cm×5 cm, and had a structure in which the upper and lower sides were connected to a copper wire structure with a width of 5 mm corresponding to a bus bar.

Example 20

A polyvinyl acetal resin film having a conductive layer was obtained in the same manner as in Example 7 except that a structure of a photomask used for photolithography was changed. The conductive layer had a structure in which copper wires having a line width of 10 μm were linearly arranged at intervals of 500 μm, and had a structure in which both ends of each straight line were connected to a copper wire structure with a width of 5 mm corresponding to a bus bar.

Example 21

A polyvinyl acetal resin film having a conductive layer was obtained in the same manner as in Example 7 except that a structure of a photomask used for photolithography was changed. The conductive layer had a structure in which copper wires having a line width of 10 μm were arranged in a wavy line form at intervals of 500 μm, and had a structure in which both ends of each wavy line were connected to a copper wire structure with a width of 5 mm corresponding to a bus bar.

Example 22

A polyvinyl acetal resin film having a conductive layer was obtained in the same manner as in Example 7 except that a structure of a photomask used for photolithography was changed. The conductive layer had a structure in which copper wires having a line width of 10 μm were arranged in a zigzag line form at intervals of 500 μm, and had a structure in which both ends of each zigzag line were connected to a copper wire structure with a width of 5 mm corresponding to a bus bar.

Comparative Example 11

Production and evaluation of the resin film as Example 23 were not performed.

As Comparative Example 11, a polyvinyl acetal resin film having a conductive layer was obtained in the same manner as in Example 7 except that a polyvinyl acetal resin film k was used instead of the polyvinyl acetal resin film c.

Example 24

A polyvinyl acetal resin film having a conductive layer was obtained in the same manner as in Example 7 except that a polyvinyl acetal resin film l was used instead of the polyvinyl acetal resin film c.

Example 25

A polyvinyl acetal resin film having a conductive layer was obtained in the same manner as in Example 7 except that when a copper foil was bonded to the polyvinyl acetal resin film c, adhesion was performed using an acrylate adhesive instead of bonding using a thermocompression bonding roll.

Comparative Example 7

A polyvinyl acetal resin film having a conductive layer was obtained in the same manner as in Example 7 except that a polyvinyl acetal resin film m was used instead of the polyvinyl acetal resin film c.

Comparative Example 8

A PET film having a conductive layer was obtained in the same manner as in Example 25 except that a PET film (50 μm in thickness) was used instead of the polyvinyl acetal resin film c.

<Production of Laminated Glass>

The polyvinyl acetal resin films having a conductive layer obtained in Examples 7 to 25 and Comparative Examples 5 to 7, and the PET film having a conductive layer obtained in Comparative Example 8 were each cut into 5 cm long and 5 cm wide, and arranged on a glass of 10 cm long, 10 cm wide and 3 mm thick. At this time, the film was arranged in an orientation in which a surface of the film having no conductive layer was in contact with the glass and in a location in which the conductive layer was located near the center of the glass. Next, an electrode (a copper foil tape with a conductive adhesive) was applied to each bus bar (5 mm wide copper wire) at both ends of the conductive layer such that each electrode end protruded out of the glass. In addition, an interlayer film for automobile windshields of 10 cm long, 10 cm wide, and 0.76 mm thick [containing polyvinyl butyral resin (72% by mass) having a hydroxyl group amount of 20.0% by mass and a viscosity average polymerization degree of 1700 and 3GO (28% by mass)] as a plasticized polyvinyl acetal resin layer, and a glass of 10 cm long, 10 cm wide, and 3 mm thick were layered thereon.

Subsequently, this layered product was placed in a vacuum bag and decompressed at room temperature for 15 minutes using a vacuum pump. Then, the temperature was raised to 100° C. while decompressing, and heating was continued as it is for 60 minutes. After the temperature was lowered, the pressure was returned to normal pressure, and a laminated glass after prelamination was taken out.

Thereafter, the laminated glass was put into an autoclave and treated at 140° C. and 1.2 MPa for 30 minutes to produce a laminated glass.

<Evaluation of State of Conductive Layer>

The state of the conductive layer after prelamination and after autoclaving was visually observed using a loupe, and the presence or absence of deformation and disconnection of the linear conductive material was evaluated based on the following criteria. The results are shown in Table 5, Table 7 and Table 8.

A Deformation and disconnection were not observed.
B Partial deformation was observed but no disconnection was observed.
C Slight disconnection was observed.
D Disconnection was remarkable.

<Evaluation of Conductivity>

Resistance between two electrodes applied on each bus bar was measured by a tester. The resistance value was measured before and after production of a laminated glass, and the conductivity was evaluated based on the following criteria. The results are shown in Table 5, Table 7 and Table 8.

A The resistance value after production of a laminated glass was extremely good, such as within 1.5 times the resistance value before production of a laminated glass.
B The resistance value after production of a laminated glass was good, such as more than 1.5 times and within 2 times the resistance value before production of a laminated glass.
C Although the resistance value after production of a laminated glass was more than 2 times and within 4 times the resistance value before production of a laminated glass, it was practical.
D The resistance value after production of a laminated glass was more than 4 times the resistance value before production of a laminated glass, and it was not practical.

<Measurement of Haze>

The polyvinyl acetal resin films having a conductive layer obtained in Examples 7 to 25 and Comparative Examples 5 to 7, and the PET film having a conductive layer obtained in Comparative Example 8 were each cut into 5 cm long and 5 cm wide, and arranged on a glass of 5 cm long, 5 cm wide and 3 mm thick. At this time, the film was arranged in an orientation in which a surface of the film having no conductive layer was in contact with the glass. An interlayer film for automobile windshields of 5 cm long, 5 cm wide, and 0.76 mm thick [containing polyvinyl butyral resin (72% by mass) having a hydroxyl group amount of 20.0% by mass and a viscosity average polymerization degree of 1700 and 3GO (28% by mass)] as a plasticized polyvinyl acetal resin layer, and a glass of 5 cm long, 5 cm wide, and 3 mm thick were layered thereon.

Subsequently, this layered product was placed in a vacuum bag and decompressed at room temperature for 15 minutes using a vacuum pump. Then, the temperature was raised to 100° C. while decompressing, and heating was continued as it is for 60 minutes. After the temperature was lowered, the pressure was returned to normal pressure, and a laminated glass after prelamination was taken out.

Thereafter, the laminated glass was put into an autoclave and treated at 140° C. and 1.2 MPa for 30 minutes to produce a laminated glass.

For each of the obtained laminated glass having a conductive layer, the haze at the time of light irradiation on the blackened surface side and the haze at the time of light irradiation on the metallic luster surface side were measured according to JIS R3106 using a haze meter. The results are shown in Table 5.

<Sensory Evaluation of Visibility of Conductive Layer>

A laminated glass in which the blackened surface side faced an observer was arranged at a position at a distance of about 50 cm from the observer. Whether a copper wire of a conductive layer was visible when the observer looked at 5 m ahead through the glass was sensually evaluated based on the following criteria. The results are shown in Table 5.

A The copper wire was hardly visible, and it was extremely good.

B The copper wire was slightly visible when the focus was shifted, but it was good.

C Although the copper wire was slightly visible, it was practical.

D The copper wire was visible, and it was not practical.

<Sensory Evaluation of the Visibility of End of Polyvinyl Acetal Resin Film>

After the laminated glass produced according to <Production of laminated glass> was left for 2 weeks at room temperature, whether an end of the polyvinyl acetal resin film having a smaller size than the interlayer film for automobile windshields was visually recognizable was sensually evaluated based on the following criteria. The results are shown in Table 5.

A The end was not recognizable at all, and it was extremely good.

B Although there was a portion in which the end was recognizable as a result of careful observation, it was good.

C Although the end was recognizable as a result of careful observation, it was practical.

D The end was clearly recognizable, and it was not practical.

<Average Plasticizer Amount>

The amount of the plasticizer (calculated value) at the time where the plasticizer contained in the interlayer film for automobile windshields as a plasticized polyvinyl acetal resin layer transferred to the polyvinyl acetal resin film and the amount of the plasticizer contained in the interlayer film for automobile windshields was compatible to the amount of the plasticizer contained in the polyvinyl acetal resin film was calculated according to the following formula. The results are shown in Table 5.

Average plasticizer amount (mass %)=$(A \times a + B \times b)/(a+b)$ [Equation 1]

A (mass %): plasticizer amount of plasticized polyvinyl acetal resin layer a (mm): thickness of plasticized polyvinyl acetal resin layer B (mass %): plasticizer amount of polyvinyl acetal resin film b (mm): thickness of polyvinyl acetal resin film

TABLE 5

| | | Polyvinyl acetal resin film or PET film | Hydroxyl group amount of resin (mass %) | | | Resin 1:Resin 2 (mass ratio) | Viscosity of 10% by mass solution of resin in toluene/ethanol = 1/1 (mPa · s) | | | Thickness of the film (μm) | Plasticizer (mass %) |
|---|---|---|---|---|---|---|---|---|---|---|---|
| | | | Resin 1 | Resin 2 | Resin 1 + Resin 2 | | Resin 1 | Resin 2 | Resin 1 + Resin 2 | | |
| Comparative | 5 | a | 19.8 | — | — | 100:0 | 152 | — | — | 50 | 0 |
| Example | 6 | b | 19.7 | — | — | 100:0 | 65 | — | — | 50 | 0 |
| Example | 7 | c | 19.8 | 20.1 | 19.9 | 75:25 | 152 | 1410 | 245 | 50 | 0 |
| | 8 | d | 19.8 | 20.1 | 20.0 | 50:50 | 152 | 1410 | 444 | 50 | 0 |
| | 9 | e | 19.8 | 20.1 | 20.0 | 25:75 | 152 | 1410 | 783 | 50 | 0 |
| | 10 | f | 19.8 | 20.1 | 19.9 | 75:25 | 152 | 1410 | 245 | 25 | 0 |
| | 11 | g | 19.8 | 20.1 | 19.9 | 75:25 | 152 | 1410 | 245 | 125 | 0 |
| | 12 | h | 19.8 | 20.1 | 19.9 | 75:25 | 152 | 1410 | 245 | 250 | 0 |
| | 13 | i | 19.8 | 20.1 | 19.9 | 75:25 | 152 | 1410 | 245 | 300 | 0 |
| | 14 | j | 19.8 | 20.1 | 19.9 | 75:25 | 152 | 1410 | 245 | 50 | 18 |
| | 15 | c | 19.8 | 20.1 | 19.9 | 75:25 | 152 | 1410 | 245 | 50 | 0 |
| | 16 | c | 19.8 | 20.1 | 19.9 | 75:25 | 152 | 1410 | 245 | 50 | 0 |
| | 17 | c | 19.8 | 20.1 | 19.9 | 75:25 | 152 | 1410 | 245 | 50 | 0 |
| | 18 | c | 19.8 | 20.1 | 19.9 | 75:25 | 152 | 1410 | 245 | 50 | 0 |
| | 19 | c | 19.8 | 20.1 | 19.9 | 75:25 | 152 | 1410 | 245 | 50 | 0 |
| | 20 | c | 19.8 | 20.1 | 19.9 | 75:25 | 152 | 1410 | 245 | 50 | 0 |
| | 21 | c | 19.8 | 20.1 | 19.9 | 75:25 | 152 | 1410 | 245 | 50 | 0 |
| | 22 | c | 19.8 | 20.1 | 19.9 | 75:25 | 152 | 1410 | 245 | 50 | 0 |
| | 24 | l | 25.8 | — | — | 100:0 | 210 | — | — | 50 | 0 |
| | 25 | c | 19.8 | 20.1 | 19.9 | 75:25 | 152 | 1410 | 245 | 50 | 0 |
| Comparative | 7 | m | 19.8 | 20.1 | 19.9 | 75:25 | 152 | 1410 | 245 | 50 | 22 |
| Example | 8 | n | PET | — | — | — | — | — | — | 50 | — |
| | 11 | k | 18.2 | — | — | 100:0 | 140 | — | — | 50 | 0 |

| | | Adhesive | Copper foil thickness (μm) | Bonding surface between the film and copper foil | Film forming properties | Conductive layer | | | | After prelamination |
|---|---|---|---|---|---|---|---|---|---|---|
| | | | | | | Bonding temperature (° C.) | Shape | Line width (μm) | Pitch | |
| Comparative | 5 | Without | 7 | Blackened surface | A | 120 | Grid | 10 | 500 | A |
| Example | 6 | Without | 7 | Blackened surface | B | 120 | Grid | 10 | 500 | A |
| Example | 7 | Without | 7 | Blackened surface | A | 120 | Grid | 10 | 500 | A |
| | 8 | Without | 7 | Blackened surface | B | 120 | Grid | 10 | 500 | A |
| | 9 | Without | 7 | Blackened surface | C | 120 | Grid | 10 | 500 | A |
| | 10 | Without | 7 | Blackened surface | — | 120 | Grid | 10 | 500 | B |
| | 11 | Without | 7 | Blackened surface | — | 120 | Grid | 10 | 500 | A |
| | 12 | Without | 7 | Blackened surface | — | 120 | Grid | 10 | 500 | A |
| | 13 | Without | 7 | Blackened surface | — | 120 | Grid | 10 | 500 | A |
| | 14 | Without | 7 | Blackened surface | — | 120 | Grid | 10 | 500 | A |
| | 15 | Without | 7 | Metallic luster surface | — | 120 | Grid | 10 | 500 | B |
| | 16 | Without | 7 | Blackened surface | — | 120 | Grid | 5 | 500 | A |

TABLE 5-continued

| | | | | | | | | | | |
|---|---|---|---|---|---|---|---|---|---|---|
| | 17 | Without | 7 | Blackened surface | — | 120 | Grid | 20 | 1000 | A |
| | 18 | Without | 7 | Blackened surface | — | 120 | Grid | 30 | 1500 | A |
| | 19 | Without | 7 | Blackened surface | — | 120 | Grid | 40 | 2000 | A |
| | 20 | Without | 7 | Blackened surface | — | 120 | Straight line | 10 | 500 | A |
| | 21 | Without | 7 | Blackened surface | — | 120 | Wavy line | 10 | 500 | A |
| | 22 | Without | 7 | Blackened surface | — | 120 | Zigzag | 10 | 500 | A |
| | 24 | Without | 7 | Blackened surface | — | 120 | Grid | 10 | 500 | A |
| | 25 | With | 7 | Blackened surface | — | 120 | Grid | 10 | 500 | A |
| Comparative Example | 7 | Without | 7 | Blackened surface | — | 120 | Grid | 10 | 500 | D |
| | 8 | With | 7 | Blackened surface | — | 120 | Grid | 10 | 500 | A |
| | 11 | Without | 7 | Blackened surface | — | 120 | Grid | 10 | 500 | A |

| | | State of conductive layer After autoclaving | Conductivity | Haze Irradiation on blackened surface side | Haze Irradiation on metallic luster surface side | Visibility of conductive layer | Visibility of film end | Average plasticizer amount (mass %) |
|---|---|---|---|---|---|---|---|---|
| Comparative Example | 5 | B | B | 1.1 | 2.0 | A | A | 26.3 |
| | 6 | C | C | 1.2 | 2.1 | A | A | 26.3 |
| Example | 7 | A | A | 1.2 | 2.1 | A | A | 26.3 |
| | 8 | A | A | 1.3 | 2.3 | A | A | 26.3 |
| | 9 | A | A | 1.4 | 2.4 | A | A | 26.3 |
| | 10 | B | B | 1.0 | 1.8 | A | A | 27.1 |
| | 11 | A | A | 1.1 | 2.0 | A | A | 24.0 |
| | 12 | A | A | 1.1 | 1.9 | A | A | 21.1 |
| | 13 | A | A | 1.2 | 2.2 | A | A | 20.1 |
| | 14 | A | A | 1.0 | 1.9 | A | A | 27.4 |
| | 15 | B | B | 1.3 | 2.3 | A | A | 26.3 |
| | 16 | A | A | 1.1 | 1.9 | A | A | 26.3 |
| | 17 | A | A | 1.3 | 2.1 | B | A | 26.3 |
| | 18 | A | A | 1.5 | 2.3 | C | A | 26.3 |
| | 19 | A | A | 1.9 | 2.8 | D | A | 26.3 |
| | 20 | A | A | — | — | A | A | 26.3 |
| | 21 | A | A | — | — | A | A | 26.3 |
| | 22 | A | A | — | — | A | A | 26.3 |
| | 24 | A | A | 1.5 | 2.4 | A | C | 26.3 |
| | 25 | A | A | 2.3 | 3.2 | A | A | 26.3 |
| Comparative Example | 7 | D | D | 1.3 | 2.2 | A | A | 27.6 |
| | 8 | A | A | 2.5 | 3.5 | A | D | — |
| | 11 | B | B | 1.5 | 2.5 | A | B | 26.3 |

As shown in Table 5, when the amount of the plasticizer in the polyvinyl acetal resin film was within the range specified in the present invention, deformation and disconnection of the conductive layer were less likely to occur when the laminated glass was produced, and the conductivity was good. When no adhesive layer was provided between the polyvinyl acetal resin film and the conductive layer, the haze at the time of light irradiation on the blackened surface side of the laminated glass produced using the polyvinyl acetal resin film and the haze at the time of light irradiation on the metallic luster surface side of the laminated glass each showed a good value.

Examples 26 to 29

In Examples 26, 27 and 29, the polyvinyl acetal resin film produced in Example 7 was used to produce a laminated glass for visible light reflectance measurement described later with the configuration of the laminated glass shown in Table 6. In Example 28, the polyvinyl acetal resin film produced in Example 15 was used to produce a laminated glass for visible light reflectance measurement described later with the configuration of the laminated glass shown in Table 6. Specifically, in the configuration of the laminated glass shown in Table 6, a glass of 5 cm long, 5 cm wide, and 3 mm thick, a polyvinyl acetal resin film cut into 5 cm long and 5 cm wide, and an interlayer film for automobile windshields of 5 cm long, 5 cm wide, and 0.76 mm thick [containing polyvinyl butyral resin (72% by mass) having a hydroxyl group amount of 20.0% by mass and a viscosity average polymerization degree of 1700 and 3GO (28% by mass)] as a plasticized polyvinyl acetal resin layer were layered. The resulting layered product was placed in a vacuum bag and decompressed at room temperature for 15 minutes using a vacuum pump. Then, the temperature was raised to 100° C. while decompressing, and heating was continued as it is for 60 minutes. After the temperature was lowered, the pressure was returned to normal pressure, and a laminated glass after prelamination was taken out. Thereafter, the laminated glass was put into an autoclave and treated at 140° C. and 1.2 MPa for 30 minutes to produce a laminated glass. At light irradiation on an inside glass (assuming the side of a person on board) of the obtained laminated glass for visible light reflectance measurement, the visible light reflectance was measured according to JIS R 3106. The results are shown in Table 6.

TABLE 6

| | Polyvinyl acetal resin film | Configuration of laminated glass | Visible light reflectance (%) |
|---|---|---|---|
| Example 26 | c | (Inside) glass/[resin film/(blackened surface) conduction (metallic luster surface)]/interlayer film/glass (outside) | 8.7 |
| 27 | c | (Inside) glass/interlayer film/[resin film/(blackened surface) conduction (metallic luster surface)]/glass (outside) | 8.8 |
| 28 | c | (Inside) glass/interlayer film/[(blackened surface) conduction (metallic luster surface)/resin film]/glass (outside) | 8.8 |
| 29 | c | (Inside) glass/interlayer film/[(metallic luster surface) conduction (blackened surface)/resin film]/glass (outside) | 9.2 |

The "resin film" indicates a polyvinyl acetal resin film.
The "conduction" indicates a conductive layer.
The "interlayer film" indicates an interlayer film for automobile windshields.

Examples 30 to 33

<Evaluation of Influence of Temperature at the Time of Bonding Polyvinyl Acetal Resin Film and Copper Foil on Peeling Strength, State of Conductive Layer, and Conductivity>

A polyvinyl acetal resin film to which a copper foil was bonded was obtained in the same manner as in Example 7 except that an A4 size polyvinyl acetal resin film c was laminated on an A4 size copper foil and thermo-compression bonded at the temperature described in Table 7 so that 8 cm of an end was not thermo-compression bonded. The obtained resin film was cut into 1 cm wide strips so that an end not thermo-compression bonded served as a portion clamped by a chuck of a tensile tester, and a tensile test was performed at a chuck distance of 4 cm and a tensile speed of 100 mm/min. A peel force of every 20 mm was output, and an average value thereof was taken as peel strength.

The state (grid shape) of the conductive layer and the conductivity were evaluated in the same manner as in Example 7 except that a copper foil was bonded by thermo-compression bonding at the temperature described in Table 7. The results are shown in Table 7.

tion and after autoclaving, and good conductivity was obtained. When the bonding temperature was higher than 100° C. (Examples 31 to 33), no deformation was observed in the shape of the linear conductive material of the conductive layer even after autoclaving, the shape was extremely well maintained, and the conductivity was very good. This result indicates that when a laminated glass is produced using the polyvinyl acetal resin film of the present invention, deformation and destruction of the functional layer or the conductive layer are well suppressed, and misalignment of a glass of the obtained laminated glass under high temperature conditions is well suppressed.

Examples 34 to 37

<Influence of Surface Roughness of Polyvinyl Acetal Resin Film on Shape Retention of Linear Conductive Material of Conductive Layer>

In Example 34, surface roughness of the polyvinyl acetal resin film c of Example 7 was evaluated according to JIS B 0601-1994 using Surftest SJ-310 (measurement force: 0.75 mN, stylus shape: tip radius 2 μm R/tip angle) 60° from Mitutoyo Corporation. The film c of Example 7 was produced using a metal elastic roll and a mirror surface metal cooling roll. In the measurement of the surface roughness of Rz and Sm, the surface in contact with the mirror surface metal cooling roll when the film c was produced was evaluated.

In Example 35, in the film c obtained in Example 34, evaluation was performed in the same manner as in Example 34 with respect to the surface in contact with the metal elastic roll. The film is referred to as the film q in Example 35.

In Example 36, in the polyvinyl acetal resin film o obtained in the same manner as in Example 34 except that a rubber elastic roll was used instead of the metal elastic roll, evaluation was performed in the same manner as in Example 34 with respect to the surface in contact with the mirror surface metal cooling roll.

In Example 37, in the polyvinyl acetal resin film p obtained in the same manner as in Example 34 except that a rubber elastic roll was used instead of a metal elastic roll and an embossed roll was used instead of a mirror surface metal cooling roll, evaluation was performed in the same

TABLE 7

| | | Polyvinyl acetal resin film | Bonding temperature (° C.) | Peeling strength (N/cm) | Conductive layer | | | State of conductive layer | | |
|---|---|---|---|---|---|---|---|---|---|---|
| | | | | | Shape | Line width (μm) | Pitch (μm) | After prelamination | After autoclaving | Conductivity |
| Example | 30 | c | 100 | 0.2 | Grid | 10 | 500 | A | B | B |
| | 31 | c | 120 | 1.9 | Grid | 10 | 500 | A | A | A |
| | 32 | c | 140 | 2.9 | Grid | 10 | 500 | A | A | A |
| | 33 | c | 150 | >3.5 | Grid | 10 | 500 | A | A | A |

As shown in Table 7, when polyvinyl acetal resin film c and the copper foil were bonded at a temperature of 100° C. or higher (Examples 30 to 33), good peel strength between the polyvinyl acetal resin film c and the copper foil was obtained, the shape of the linear conductive material of the conductive layer was well maintained both after prelaminamanner as in Example 34 with respect to a surface in contact with the embossed roll.

The evaluation results of Examples 34 to 37 are shown in Table 8. In Examples 34 to 37, the state and conductivity of the conductive layer were evaluated in the same manner as in Example 7. The results are shown in Table 8.

TABLE 8

| | | Polyvinyl acetal resin film | OH group amount of resin (mass %) | | Resin 1:Resin 2 (mass ratio) | Viscosity of 10% by mass solution of resin in toluene/ethanol = 1/1 (mPa · s) | Thickness of the film (μm) | Plasticizer (mass %) | Adhesive | Copper foil thickness (μm) |
|---|---|---|---|---|---|---|---|---|---|---|
| | | | Resin 1 | Resin 2 | | | | | | |
| Example | 34 | c | 19.8 | 20.1 | 75:25 | 245 | 50 | 0 | Without | 7 |
| | 35 | q | 19.8 | 20.1 | 75:25 | 245 | 50 | 0 | Without | 7 |
| | 36 | o | 19.8 | 20.1 | 75:25 | 245 | 50 | 0 | Without | 7 |
| | 37 | p | 19.8 | 20.1 | 75:25 | 245 | 50 | 0 | Without | 7 |

| | | Bonding surface between the film and copper foil | Surface roughness | | Conductive layer | | | State of conductive layer | | Conductivity |
|---|---|---|---|---|---|---|---|---|---|---|
| | | | Rz (μm) | Sm (μm) | Shape | Line width (μm) | Pitch (μm) | After prelamination | After autoclaving | |
| Example | 34 | Blackened surface | 1.3 | 3190 | Grid | 10 | 500 | A | A | A |
| | 35 | Blackened surface | 2.2 | 2960 | Grid | 10 | 500 | B | B | B |
| | 36 | Blackened surface | 1.9 | 1480 | Grid | 10 | 500 | B | B | B |
| | 37 | Blackened surface | 4.2 | 1410 | Grid | 10 | 500 | C | C | C |

As shown in Table 8, when the ten-point average roughness Rz of the polyvinyl acetal resin film was small and the mean spacing Sm of unevenness was large (Example 34), the shape of the conductive layer was well maintained both after prelamination and after autoclaving. This indicates that when the surface of the polyvinyl acetal resin film is smooth, it is possible to achieve more uniform and even bonding between the polyvinyl acetal resin film and the copper foil. Consequently, when a laminated glass is produced using the polyvinyl acetal resin film of the present invention, deformation and destruction of the functional layer or the conductive layer are well suppressed, and misalignment of a glass of the obtained laminated glass under high temperature conditions is well suppressed.

Next, influence of a feature that the highest temperature among the melting point and the glass transition temperature of the resin composition constituting the polyvinyl acetal resin film is 30° C. or more and 180° C. or less on curved surface followability of the polyvinyl acetal resin film laminated with a glass having a curved surface, influence of an adhesive on the haze, and influence of blackening on light reflection (visibility of the conductive layer) were examined.

<Production of Polyvinyl Acetal Resin Film>

A polyvinyl butyral resin 1 (hereinafter referred to as "resin 1") was melt-kneaded, or the resin 1 and a polyvinyl butyral resin 2 (hereinafter referred to as "resin 2") were melt-kneaded at a mass ratio described in Table 10. When the polyvinyl acetal resin film contained a plasticizer (polyvinyl acetal resin films r to t), a predetermined amount of 3GO was melt-kneaded together with the resin 1, or the resin 1 and the resin 2. Next, the obtained melt-kneaded product was extruded into strands and pelletized. The obtained pellet was melt-extruded using a single screw extruder and a T-die, and polyvinyl acetal resin films a, c, and r to t with a smooth surface were obtained using a metal elastic roll. The polyvinyl butyral resins (A, B and D) used are shown in Table 9, and the produced polyvinyl acetal resin film or PET used is shown in Table 10.

TABLE 9

| Resin | Hydroxyl group amount (mol %) | Acetyl group amount (mol %) | Viscosity of 10% by mass solution of resin in toluene/ethanol = 1/1 (mPa · s) |
|---|---|---|---|
| A | 28.5 (19.8 mass %) | 0.7 (0.9 mass %) | 152 |
| B | 28.9 (20.1 mass %) | 0.7 (1.0 mass %) | 1410 |
| D | 20.9 (14.0 mass %) | 0.8 (1.1 mass %) | 133 |

TABLE 10

| Polyvinyl acetal resin film | Resin 1 | Resin 2 | Resin 1:Resin 2 (mass ratio) | Viscosity of 10% by mass solution of resin in toluene/ethanol = 1/1 (mPa · s) | | | Plasticizer (mass %) | Glass transition point Tg (° C.) | Melting point Tm$^a$ (° C.) | Thickness (μm) |
|---|---|---|---|---|---|---|---|---|---|---|
| | | | | Resin 1 | Resin 2 | Resin 1 + Resin 2 | | | | |
| a | A | — | — | 152 | — | — | 0 | 71 | — | 50 |
| c | A | B | 75:25 | 152 | 1410 | 245 | 0 | 71 | — | 50 |
| r | A | B | 25:75 | 152 | 1410 | 783 | 18 | 40 | — | 50 |
| s | D | — | — | 133 | — | — | 17 | 38 | — | 50 |
| t | B | — | — | 1410 | — | — | 28 | 17 | — | 50 |
| PET | — | — | — | — | — | — | 0 | 82 | 254 | 50 |

$^a$"—" means that no melting point is observed.

Reference Example 1

<Production of Polyvinyl Acetal Resin Film with Copper Foil Bonded>

A 7 μm thick copper foil whose one surface was blackened was layered on the polyvinyl acetal resin film a in such an orientation that the blackened surface and the polyvinyl acetal resin film a were in contact with each other. Here, the visible light reflectance of the blackened surface measured according to JIS R 3205 (2005) was 5.2%. Next, the upper and lower sides of the layered product in which the polyvinyl acetal resin film and the copper foil were layered were sandwiched between 50 μm thick PET films, and the layered product was passed between thermocompression bonding rolls set at 140° C. (pressure: 0.2 MPa, speed: 0.5 m/min). Then, the PET films were peeled off to obtain the polyvinyl acetal resin film a to which the copper foil was bonded.

<Production of Polyvinyl Acetal Resin Film Having Conductive Layer>

After a dry film resist was laminated on the copper foil of the polyvinyl acetal resin film a to which the copper foil was bonded, an etching resistance pattern was formed using a photolithography method. Furthermore, the polyvinyl acetal resin film a was immersed in a copper etching solution to form a conductive structure (a conductive layer), and then a remaining photoresist layer was removed by a conventional method. Consequently, a polyvinyl acetal resin film having the polyvinyl acetal resin film a and a conductive layer based on the copper foil formed on the polyvinyl acetal resin film [conductive layer forming region: 10 cm in the longitudinal direction of the linear conductive material (wiring), 5 cm in the lateral direction of the linear conductive material] was obtained. This polyvinyl acetal resin film does not have an adhesive layer between the polyvinyl acetal resin film a and the conductive layer. The conductive layer had a structure in which wavy copper wires with a line width of 10 μm were arranged at intervals of 1 mm, and the copper wires had a structure in which the copper wires did not cross each other, the distance between both ends of each copper wire was 10 cm, and upper and lower end portions of each copper wire were connected to a 5 mm wide copper wire structure corresponding to a bus bar.

<Evaluation of State of Conductive Layer>

The state of the conductive layer was visually observed using a loupe and evaluated based on the following criteria. The results are shown in Table 11.

A Deformation and disconnection were not observed.
B Partial deformation was observed but no disconnection was observed.
C Slight disconnection was observed.
D Disconnection was remarkable.

<Blackening of Polyvinyl Acetal Resin Film>

2 mL of a blackening solution (Sea Force Co., Ltd.) was added to 100 mL of ion-exchanged water, and the mixture was stirred for 1 minute to prepare a blackening treatment solution. The conductive layer of the produced polyvinyl acetal resin film was arranged so as to face the blackening treatment solution, and was immersed at 25° C. for 3 minutes, and the polyvinyl acetal resin film was washed with ion exchange water to perform blackening treatment. By this treatment, a polyvinyl acetal resin film in which all surfaces of the conductive layer were blackened was obtained.

<Production of Flat Laminated Glass>

The polyvinyl acetal resin film obtained in Reference Example 1 was cut into 13 cm long and 7 cm wide so as to include all the conductive layer and all the bus bars, and arranged on a glass of 20 cm long, 10 cm wide and 3 mm thick. At this time, the film was arranged in an orientation in which a surface of the film having no conductive layer was in contact with the glass and in a location in which the conductive layer was located near the center of the glass. Next, an electrode (a copper foil tape with a conductive adhesive) was applied to each bus bar (5 mm wide copper wire) at both ends of the conductive layer such that each electrode end protruded out of the glass. In addition, an interlayer film for automobile windshields of 20 cm long, 10 cm wide, and 0.76 mm thick [containing polyvinyl butyral resin (72% by mass) having a hydroxyl group amount of 28.8% by mass and a viscosity average polymerization degree of 1700 and 3GO (28% by mass)] as a plasticized polyvinyl acetal resin layer, and a glass of 20 cm long, 10 cm wide, and 3 mm thick were layered thereon.

Subsequently, this layered product was placed in a vacuum bag and decompressed at room temperature for 15 minutes using a vacuum pump. Then, the temperature was raised to 100° C. while decompressing, and heating was continued as it is for 60 minutes. After the temperature was lowered, the pressure was returned to normal pressure, and the laminated glass after prelamination was put into an autoclave and treated at 140° C. and 1.2 MPa for 30 minutes to produce a flat laminated glass.

<Production of Curved Laminated Glass>

A curved laminated glass was produced in the same manner as in <Production of flat laminated glass> described above, except that a watch glass [diameter: 150 mm, radius of curvature (R): 139.7 mm] was used instead of a glass of 20 cm long, 10 cm wide, and 3 mm thick.

<Sensory Evaluation of Visibility of Conductive Layer>

A laminated glass whose surface blackened with the blackening solution faced an observer was installed at a position about 50 cm away from a line of sight of the observer such that the conductive layer was aligned horizontally with the ground, and line-emitting LED light aligned horizontally with the ground was installed at a position 5 cm away from a laminated glass surface on the opposite side of the observer across the glass. The LED light was installed such that an angle connecting a light source of the LED light, the light entrance point to the laminated glass surface, and the line of sight of the observer became four points of 180°, 135°, 90° and 45°, and that the laminated glass was arranged at an angle dividing the angle into two equal angles. Then, visibility was evaluated based on the following criteria according to the number of angles at which metallic luster of the conductive layer was visible. When appearance of the conductive layer changed due to the presence or absence of light, it was judged that "metallic luster was visible".

A The number of angles at which metallic luster was visible was 0; the linear conductive material was hardly visible and visibility was good at all angles.
B The number of angles at which metallic luster was visible was 0; although the linear conductive material was visible, visibility was good at all angles.
C The number of angles at which metallic luster was visible was 1 to 2; visibility was generally good, but poor at some angles.
D The number of angles at which metallic luster was visible was 3 to 4; visibility was poor.

<Evaluation of Curved Surface Followability>

The conductive layer of the obtained curved laminated glass was observed, and the curved surface followability was evaluated based on the following criteria. The results are shown in Table 11.

A No disconnection and no major deformation in the linear conductive material.

B Disconnection was observed in 5% or less of the linear conductive material, or the linear conductive material was slightly deformed.

C Disconnection was observed in 20% or less of the linear conductive material, or the linear conductive material was clearly deformed.

D Disconnection was observed in more than 20% of the linear conductive material, or the linear conductive material was greatly deformed.

Example 38

A polyvinyl acetal resin film having a conductive layer whose all surfaces were blackened, a flat laminated glass, and a curved laminated glass were produced in the same manner as in Reference Example 1 except that the polyvinyl acetal resin film c was used instead of the polyvinyl acetal resin film a.

Example 39

A polyvinyl acetal resin film having a conductive layer whose all surfaces were blackened, a flat laminated glass, and a curved laminated glass were produced in the same manner as in Reference Example 1 except that the polyvinyl acetal resin film r was used instead of the polyvinyl acetal resin film a.

Example 40

A polyvinyl acetal resin film having a conductive layer whose all surfaces were blackened, a flat laminated glass, and a curved laminated glass were produced in the same manner as in Example 38 except that the linear conductive material had a width of 5 μm.

Reference Example 2

A polyvinyl acetal resin film having a conductive layer whose all surfaces were blackened and a curved laminated glass were produced in the same manner as in Reference Example 1 except that the polyvinyl acetal resin film s was used instead of the polyvinyl acetal resin film a.

A flat laminated glass was produced in the same manner as in Reference Example 1 except that a PET film (50 μm in thickness) was sandwiched between a glass and a polyvinyl acetal resin film in the production of the flat laminated glass. The PET film was peeled off from the polyvinyl acetal resin film once a week, and the amount of plasticizer contained in the polyvinyl acetal resin film was quantitatively tracked by reflection JR (ATR). As a result, it was confirmed that the amount of plasticizer exceeded 38% by mass after 4 weeks. That is, it turned out that when the polyvinyl acetal resin film s was used, sound insulation performance could be provided to the laminated glass of the present invention.

Comparative Example 9

<Low Tg film: polyvinyl acetal resin film with high plasticizer amount (28% by mass)>

The procedure was carried out in the same manner as in Reference Example 1 except that a polyvinyl acetal resin film t (no melting point, the highest temperature among the glass transition temperatures was 17° C.) was used instead of the polyvinyl acetal resin film a. An attempt was made to form a conductive layer in the same manner as in Reference Example 1, but disconnection was observed.

Comparative Example 10

<High Melting Point Film: PET>

A PET film having a conductive layer whose all surfaces were blackened, a flat laminated glass, and a curved laminated glass were produced in the same manner as in Reference Example 1 except that a polyethylene terephthalate (PET) film (PET layer, thickness 50 μm, melting point 260° C.) described in Table 10 was used instead of the polyvinyl acetal resin film a, and copper foil was bonded using an acrylate adhesive instead of a thermocompression bonding roll.

Reference Example 3

<Blacking of Only Bonding Surface Between Conductive Layer and Polyvinyl Acetal Resin Film>

A polyvinyl acetal resin film, a flat laminated glass, and a curved laminated glass were produced in the same manner as in Reference Example 1 except that the polyvinyl acetal resin film was not blackened after the formation of the conductive layer.

Reference Example 4

<Blackening Treatment Except for Bonding Surface Between Conductive Layer and Polyvinyl Acetal Resin Film>

A blackened polyvinyl acetal resin film, a flat laminated glass, and a curved laminated glass were produced in the same manner as in Reference Example 1 except that a copper foil surface not blackened was bonded to the polyvinyl acetal resin film a.

TABLE 11

| | Substrate | Adhesive layer | Copper foil bonding surface | Line width μm | Shape | Pitch μm | Blackening treatment after conductive layer formation | Blackened surface of conductive layer | State of conductive layer | Haze | Forward visibility | Curved surface followability |
|---|---|---|---|---|---|---|---|---|---|---|---|---|
| Reference Example 1 | a | Without | Blackened surface | 10 | Wavy line | 1000 | With | All surfaces | A | 1.2 | B | B |
| Example 38 | c | Without | Blackened surface | 10 | Wavy line | 1000 | With | All surfaces | A | 1.2 | B | A |
| Example 39 | r | Without | Blackened surface | 10 | Wavy line | 1000 | With | All surfaces | A | 1.2 | B | A |

TABLE 11-continued

| | Substrate | Adhesive layer | Copper foil bonding surface | Line width μm | Shape | Pitch μm | Blackening treatment after conductive layer formation | Blackened surface of conductive layer | State of conductive layer | Haze | Forward visibility | Curved surface followability |
|---|---|---|---|---|---|---|---|---|---|---|---|---|
| Example 40 | c | Without | Blackened surface | 5 | Wavy line | 1000 | With | All surfaces | A | 0.8 | A | A |
| Reference Example 2 | s | Without | Blackened surface | 10 | Wavy line | 1000 | With | All surfaces | A | 1.3 | B | A |
| Comparative Example 9 | t | Without | Blackened surface | 10 | Wavy line | 1000 | With | All surfaces | C | 1.1 | B | D |
| Comparative Example 10 | PET | With | Blackened surface | 10 | Wavy line | 1000 | With | All surfaces | A | 2.5 | B | D |
| Reference Example 3 | a | Without | Blackened surface | 10 | Wavy line | 1000 | Without | Only bonding surface | A | 1.3 | D | B |
| Reference Example 4 | a | Without | Non-blackened surface | 10 | Wavy line | 1000 | With | Other than bonding surface | B | 1.3 | C | B |

As described above, the polyvinyl acetal resin film (Examples 38 to 40 and Reference Examples 1 to 2) with the conductive layer composed of the resin composition whose highest temperature among the melting point and the glass transition temperature was 30° C. or more and 180° C. or less was excellent in curved surface followability, and disconnection of the linear conductive material was not observed even when the polyvinyl acetal resin film was laminated on a glass having a curved surface. The polyvinyl acetal resin film in which all the surfaces of the conductive layer were treated to have low reflectance did not cause unexpected light reflection against strong light from any direction and had excellent forward visibility (Examples 38 to 40 and Reference Examples 1 and 2). Thus, a laminated glass using such a polyvinyl acetal resin film is particularly suitable for automobile windshields because the forward visibility is good even at night. In Examples 38 to 40 and Reference Examples 1 and 2 using the polyvinyl acetal resin, bondability at an interface with the plasticized polyvinyl acetal resin layer was excellent, and, at the same time, optical unevenness was extremely small.

DESCRIPTION OF REFERENCE SIGNS

10 Laminated glass for measuring heat creep resistance value
11 Glass A
12 Glass B
13 Laminate of polyvinyl acetal resin film and plasticized polyvinyl butyral resin layer
13A Polyvinyl acetal resin film
13B 0.76 mm thick plasticized polyvinyl butyral resin layer
13C 0.38 mm thick plasticized polyvinyl butyral resin layer
13D 0.38 mm thick plasticized polyvinyl butyral resin layer
20 Laminated glass for measuring heat creep resistance value to which iron plate is bonded
21 Iron plate

The invention claimed is:

1. A polyvinyl acetal resin film for laminated glass, wherein:
a viscosity of toluene/ethanol=1/1 (by mass ratio) solution of a polyvinyl acetal resin in a resin composition constituting the polyvinyl acetal resin film with a concentration of 10% by mass, measured at 30 rpm and 20° C. by using a Brookfield-type (B-type) viscometer, being more than 200 mPa·s,
the polyvinyl acetal resin film comprising a plasticizer in an amount of 0 to 20% by mass based on a total mass of the resin composition constituting the polyvinyl acetal resin film,
wherein molecular weight distribution of the polyvinyl acetal resin in the resin composition constituting the polyvinyl acetal resin film is 2.7 or more,
wherein the amount of the plasticizer is 0 to 15 parts by mass with respect to 100 parts by mass of the polyvinyl acetal resin,
wherein the amount of the polyvinyl acetal resin contained in the resin composition is 50% by mass or more based on the total mass of the resin composition, and
the polyvinyl acetal resin film having a thickness of 10 to 350 μm.

2. The polyvinyl acetal resin film according to claim 1, wherein a value indicating heat creep resistance measured with the polyvinyl acetal resin film bonded to a 0.76 mm thick plasticized polyvinyl butyral resin layer which contains 72% by mass of polyvinyl butyral resin having an acetalization degree of 69 to 71 mol % and containing a vinyl acetate unit as an acetyl group in an amount of 1 mol % or less and 28% by mass of triethylene glycol-bis-(2-ethylhexanoate) is 10 mm or less,
the value indicating heat creep resistance being measured by a method of bonding the polyvinyl acetal resin film and the plasticized polyvinyl butyral resin layer, cutting the bonded polyvinyl acetal resin film and plasticized polyvinyl butyral resin layer into a sample having dimensions of 100 mm wide and 270 mm long, arranging and bonding the sample so as to be fit between glass A and glass B that have a width of 100 mm, a length of 300 mm and a thickness of 3 mm and are shifted by 30 mm in a length direction such that the glass A, the polyvinyl acetal resin film, the plasticized polyvinyl butyral resin layer, and the glass B are arranged in this order, bonding an iron plate of 1 kg with an adhesive to a surface of the glass B, which is opposite to a surface bonded to the plasticized polyvinyl butyral resin layer, to obtain a sample with the iron plate, and, after the sample with the iron plate is left in a thermostat at 100° C. for 1 week in a state in which a portion protruding 30 mm in the length direction faces upward and the glass A is fixed such that an angle of the sample with the iron plate is 80 to 90° with respect to a horizontal plane and a portion of the glass B to which the iron plate is bonded serves as an upper portion or an upper surface of the sample, measuring a distance (mm) by which the glass B has deviated.

3. The polyvinyl acetal resin film according to claim 1, wherein the polyvinyl acetal resin in the resin composition constituting the polyvinyl acetal resin film is a mixture of at least two polyvinyl acetal resins having different viscosity average polymerization degrees, or an acetalized product of a mixture of at least two polyvinyl alcohol-based resins having different viscosity average polymerization degrees.

4. The polyvinyl acetal resin film according to claim 1, wherein the resin composition constituting the polyvinyl acetal resin film contains an alkali metal salt and/or an alkaline earth metal salt.

5. The polyvinyl acetal resin film according to claim 1, wherein a hydroxyl group amount of the polyvinyl acetal resin in the resin composition constituting the polyvinyl acetal resin film is 26 to 34 mol %.

6. The polyvinyl acetal resin film according to claim 1, wherein the amount of the plasticizer is 0 to 5 parts by mass with respect to 100 parts by mass of the polyvinyl acetal resin.

7. The polyvinyl acetal resin film according to claim 1, wherein the polyvinyl acetal resin film comprises a functional layer on at least one side of the polyvinyl acetal resin film.

8. The polyvinyl acetal resin film according to claim 7, comprising no adhesive layer between the polyvinyl acetal resin film and the functional layer.

9. The polyvinyl acetal resin film according to claim 7, wherein the functional layer is a conductive layer.

10. The polyvinyl acetal resin film according to claim 9, comprising another polyvinyl acetal resin film on a surface having the conductive layer of the polyvinyl acetal resin film.

11. The polyvinyl acetal resin film according to claim 9, wherein the conductive layer is based on metal foil.

12. The polyvinyl acetal resin film according to claim 9, wherein the conductive layer has a linear, grid-like or net-like shape.

13. The polyvinyl acetal resin film according to claim 9, wherein the conductive layer comprises a plurality of linear conductive materials having a line width of 1 to 30 µm.

14. The polyvinyl acetal resin film according to claim 9, wherein one or both sides of the conductive layer are subjected to a low-reflectance treatment.

15. The polyvinyl acetal resin film according to claim 9, comprising a bus bar connected to the conductive layer.

16. The polyvinyl acetal resin film according to claim 15, wherein the bus bar is integrally formed with the conductive layer.

17. A laminate comprising the polyvinyl acetal resin film according to claim 7 and a plasticized polyvinyl acetal resin layer between a plurality of transparent substrates.

18. The laminate according to claim 17, wherein a difference between a hydroxyl group amount of the polyvinyl acetal resin in the resin composition constituting the polyvinyl acetal resin film and a hydroxyl group amount of the polyvinyl acetal resin in the resin composition constituting the plasticized polyvinyl acetal resin layer is 4% by mass or less as a difference in percentage by mass of vinyl alcohol units.

19. The laminate according to claim 17, wherein the plasticized polyvinyl acetal resin layer has at least one function selected from the group consisting of a specific wavelength light shielding function, a heat shielding function, a sound insulating function, a light emitting function, a display function and a double image prevention function.

20. A method of producing the polyvinyl acetal resin film according to claim 7, comprising applying a material constituting the functional layer by coating, printing or lamination on at least one side of the polyvinyl acetal resin film.

* * * * *